(12) United States Patent
Stjernholm et al.

(10) Patent No.: US 8,699,441 B2
(45) Date of Patent: Apr. 15, 2014

(54) DYNAMIC RADIO RESOURCE CONTROL STATE SWITCHING

(75) Inventors: Paul Stjernholm, Lidingö (SE); Mathias Sintorn, Sollentuna (SE); Lotta Voigt, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 124 days.

(21) Appl. No.: 13/341,885

(22) Filed: Dec. 30, 2011

(65) Prior Publication Data

US 2013/0088962 A1 Apr. 11, 2013

Related U.S. Application Data

(60) Provisional application No. 61/544,205, filed on Oct. 6, 2011.

(51) Int. Cl.
*H04W 4/00* (2009.01)

(52) U.S. Cl.
USPC .......................................... 370/329; 370/436

(58) Field of Classification Search
USPC ................................................. 370/235, 252
See application file for complete search history.

(56) References Cited

U.S. PATENT DOCUMENTS

| | | | |
|---|---|---|---|
| 6,347,091 B1 | 2/2002 | Wallentin et al. | |
| 7,680,478 B2 | 3/2010 | Willars et al. | |
| 2004/0017795 A1 | 1/2004 | Abraham et al. | |
| 2006/0009227 A1* | 1/2006 | Cudak et al. | 455/450 |
| 2006/0052137 A1* | 3/2006 | Randall et al. | 455/560 |
| 2007/0259637 A1 | 11/2007 | Basir et al. | |
| 2010/0302957 A1* | 12/2010 | Ketheesan et al. | 370/252 |
| 2012/0122405 A1 | 5/2012 | Gerber et al. | |
| 2013/0089038 A1* | 4/2013 | Hannu et al. | 370/329 |

FOREIGN PATENT DOCUMENTS

| | | |
|---|---|---|
| EP | 1 798 998 A1 | 6/2007 |
| GB | 2 398 968 A | 9/2004 |
| WO | 02/39775 A1 | 5/2002 |
| WO | 03/096730 A1 | 11/2003 |
| WO | 2007/053106 A1 | 5/2007 |
| WO | 2010/047630 A1 | 4/2010 |

OTHER PUBLICATIONS

Liers et al, "UMTS Data Capacity Improvements Employing Dynamic RRC Timeouts", IEEE 16$^{th}$ International Symposium on Personal, Indoor and Mobile Radio Communications, 2005, pp. 2186-2190.

Renesas Mobile Europe Ltd, et al., "UE Battery Life Improvements and Signalling Reduction," 3GPP TSG-RAN WG5 Meeting #75bis; R2-115322; Oct. 2011.

(Continued)

*Primary Examiner* — Anh-Vu Ly
*Assistant Examiner* — Hashim Bhatti
(74) *Attorney, Agent, or Firm* — Nixon & Vanderhye, P.C.

(57) ABSTRACT

A node (26) controls transitions between radio resource control states for a wireless terminal (30) in a radio access network (24). The radio resource control states comprise a first state and a second state. The node (26) comprises a capacity manager (60) and a radio resource manager (40). The capacity manager (60) is configured to monitor a network condition of the radio access network (24). The radio resource manager (60) is configured to make a decision whether to make a transition from the first state to the second state by determining whether (1) a cost of remaining in the first state is greater than (2) a cost of switching to the second state, and wherein the radio resource manager is configured to take the network condition into consideration when making the decision.

35 Claims, 12 Drawing Sheets

(56) References Cited

OTHER PUBLICATIONS

European Search Report issued in U.S. Appl. No. 12/187,252 filed Feb. 6, 2013.
Yeh et al, "Performance Analysis of Energy Consumption in 3GPP Networks", IEEE Wireless Telecommunications Symposium, 2004, pp. 67-72.
3GPP TS 25.331 V10.4.0 (Jun. 2011), 3rd Generation Partnership Project; Technical Specification Group Radio Access Network; Radio Resource Control (RRC); Protocol specification (Release 10).
U.S. Office Action mailed Oct. 9, 2013 in U.S. Appl. No. 13/322,982.
Ramirez et al, "Smartphone Traffic Patters", KTH Information and Communication Technology, Jul. 17, 2011.

* cited by examiner

TIMER INITIATION    TIMER EXPIRY

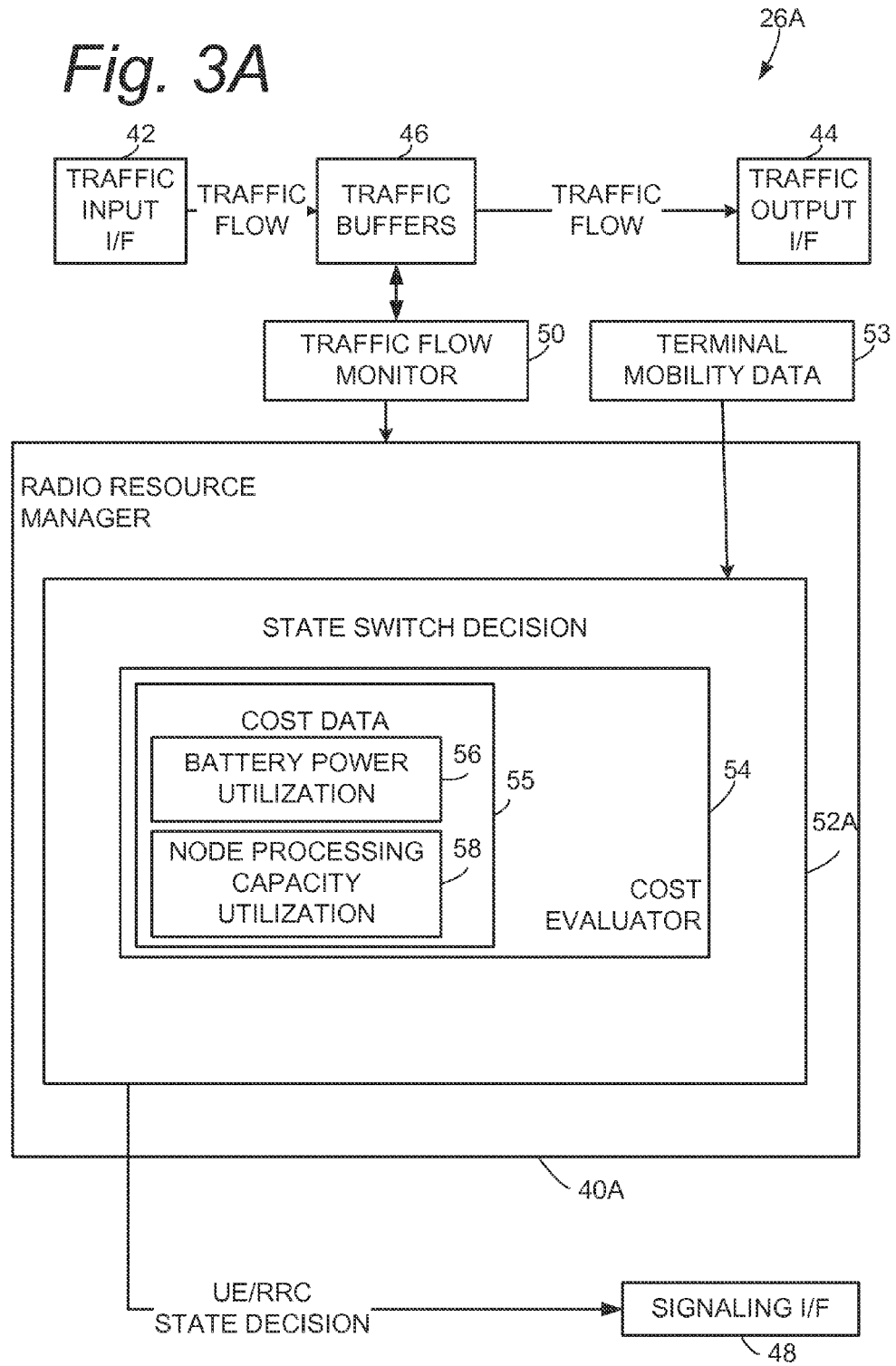

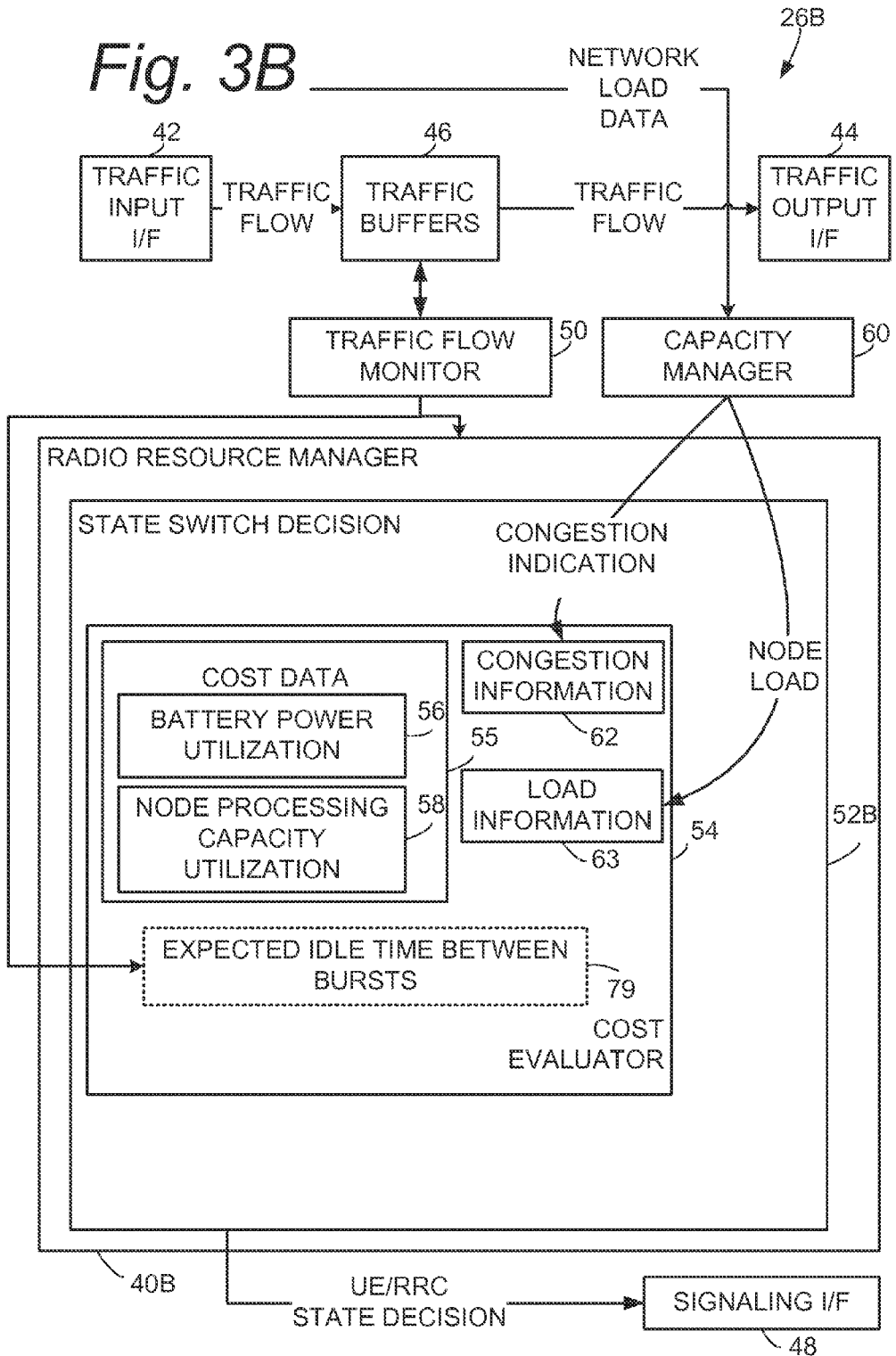

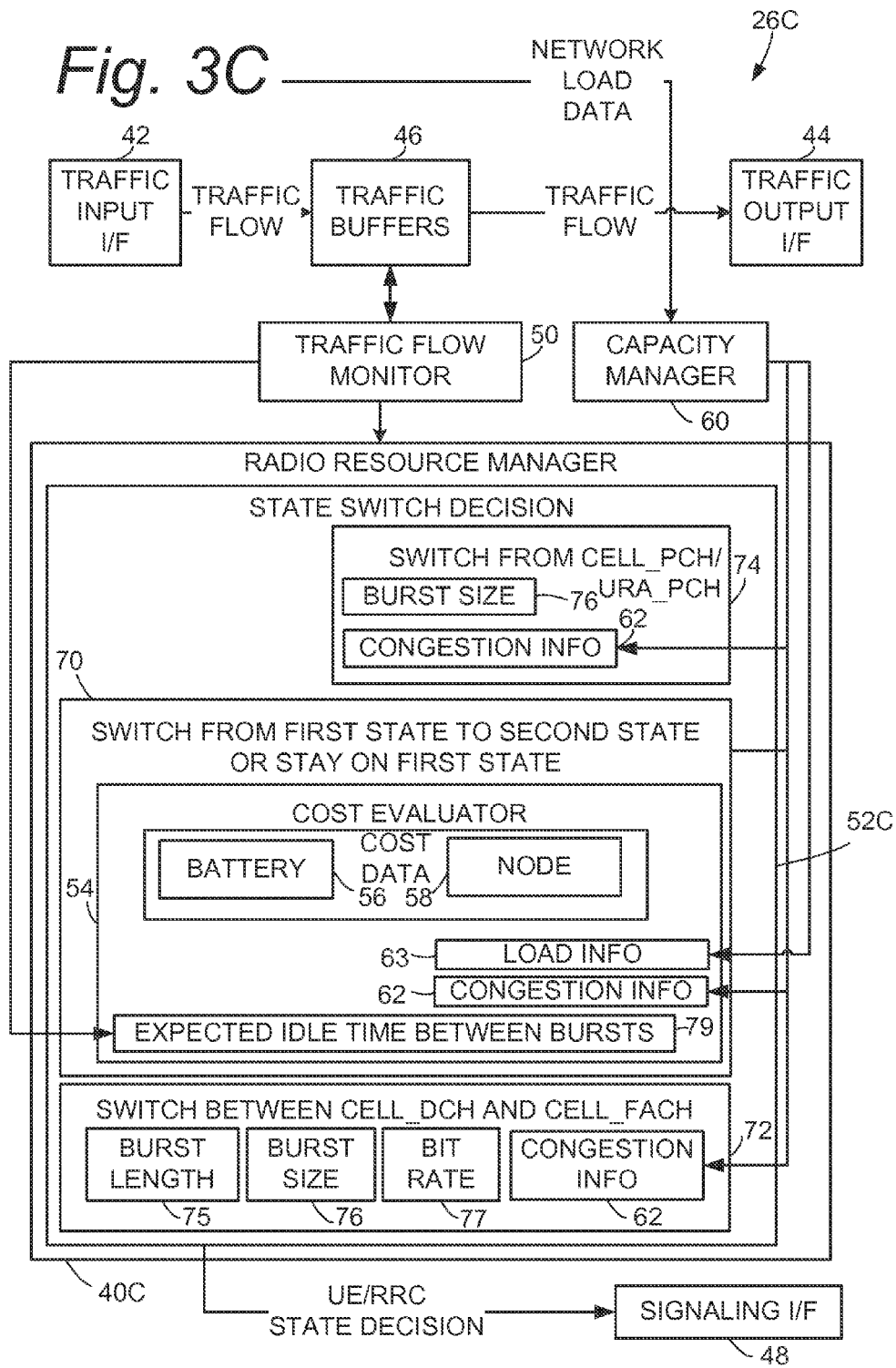

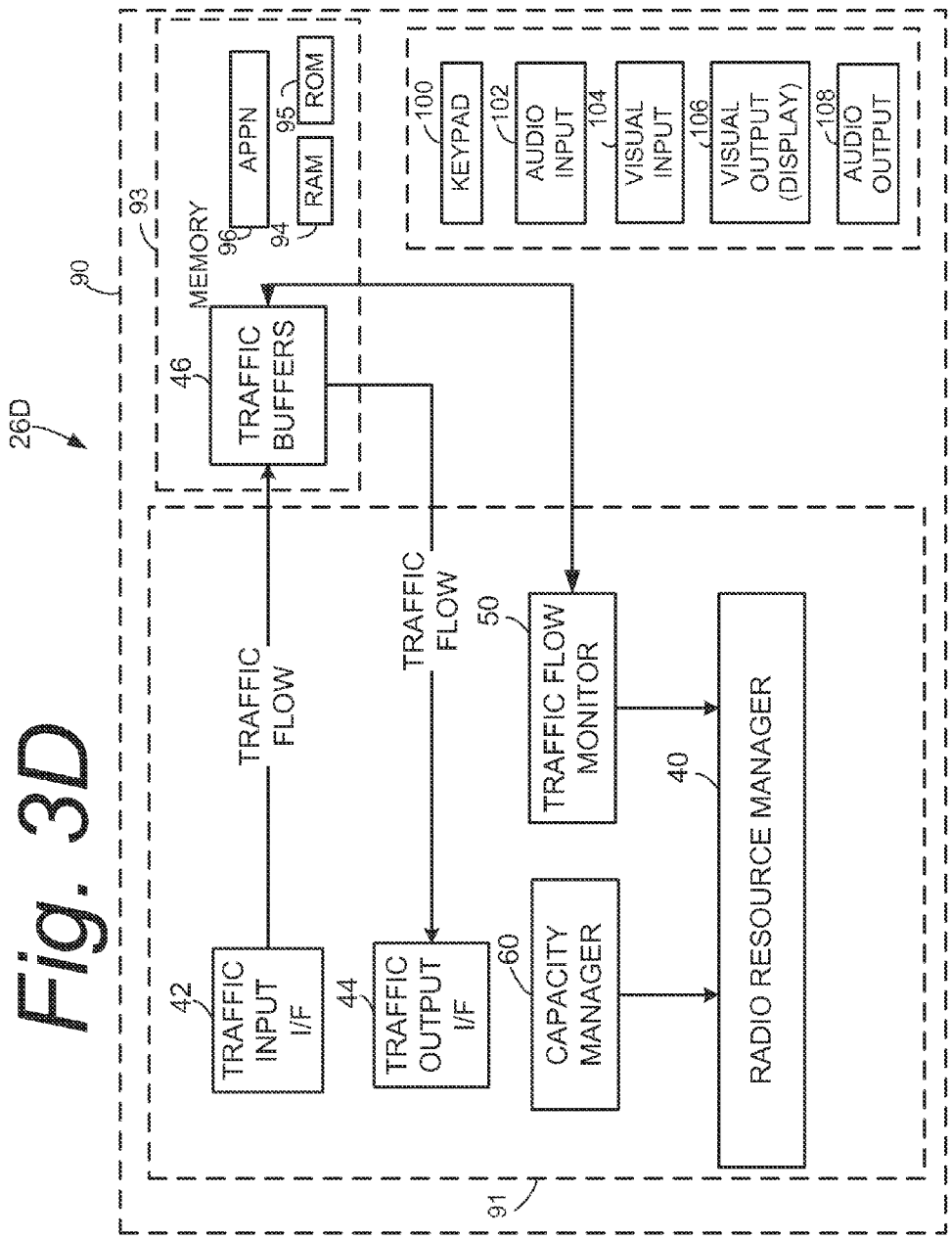

WINDOW FOR ESTIMATING BIT RATE (BR)

DYNAMIC RADIO RESOURCE CONTROL STATE SWITCHING

This application claims the priority and benefit of U.S. provisional patent application 61/544,205 filed Oct. 6, 2011, which is incorporated herein by reference in its entirety.

TECHNICAL FIELD

This invention pertains to telecommunications, and particularly to method and apparatus for governing the transitioning between radio resource control (RRC) states for a wireless terminal or user equipment unit (UE).

BACKGROUND

In a typical cellular radio system, wireless terminals, also known as mobile stations and/or user equipment units (UEs), communicate via a radio access network (RAN) to one or more core networks. The radio access network covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. Another identity identifying the cell is also broadcasted in the cell. The base stations communicate over the air interface operating on radio frequencies with the user equipment units (UE) within range of the base stations.

In some versions of the radio access network, several base stations are typically connected, e.g., by landlines or microwave, to a controller node, such as a radio network controller (RNC) or a base station controller (BSC), which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). The UMTS terrestrial radio access network (UTRAN) is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity.

Mobile telecommunications systems are normally statically configured with a parameter set defining the behavior of the system. The systems are based on standards which define radio bearers to carry traffic with different characteristics, e.g. speech, streaming video, or packet data. Standards such as the 3GPP standards referenced above also define different UE/RRC states. See, for example chapter 7 in 3GPP TS 25.331 V10.4.0 (2011-06), 3rd Generation Partnership Project; Technical Specification Group Radio Access Network; Radio Resource Control (RRC); Protocol specification (Release 10), incorporated herein by reference, which describes states such as CELL_DCH state, CELL_FACH state, CELL_PCH state, URA_PCH state, and the Idle state. These names of these states are understood in view of the following channels/areas: Dedicated Channel (DCH); Forward Access Channel (FACH); Random Access Channel (RACH); Paging Channel (PCH); UTRAN registration area (URA).

For each wireless terminal in the connected mode, a node of the radio access network, such as a radio network controller (RNC) node, determines in which of these states the wireless terminal operates. Whichever of the UE/RRC states a wireless terminal currently is in has consequences which affect, e.g., the UE battery consumption and the resource consumption in the mobile network.

For UTRAN (WCDMA) in particular the 3GPP standard defines the Radio Access Bearer (RAB) to carry the services, where the Interactive RAB is specified for best effort traffic. The 3GPP standard also defines UE/RRC states such as CELL_DCH, CELL_FACH, CELL_PCH, and URA_PCH, mentioned above.

Packet data services have escalated, particularly with the introduction of wireless terminals in the form of devices such as Smartphones, and with personal computers (PCs) now widely participating in the mobile networks. Most of the packet traffic is based on the internet protocol (IP), e.g., internet services, and is normally treated as best effort traffic in the mobile network. Internet services are of many types and different characteristics, e.g. web browsing, chat, email, file sharing, and video streaming.

Within an Internet Protocol (IP) flow there are typically times of activity and times of inactivity. Periods of activity will be separated by times of inactivity of different length. Within the IP flow, a burst can for example be defined by IP packets arriving with a maximum inter-arrival time ($IAT_{max}$). The Idle Time Between bursts (ITB) is defined as the time between the last packet in one burst and the first packet of the next burst.

As mentioned above, a radio access network node such as the radio network controller keeps track of the UE/RRC state in which a wireless terminal is currently operating and also governs the transition of the wireless terminal between UE/RRC states. In other words, the radio network controller determines when a wireless terminal should transition from one UE/RRC state, such as the CELL_DCH state, to another state, such as the URA_PCH state, for example. Parameters to govern the transition between UE/RRC states are normally timer based. FIG. 1 generally depicts that, when switching from a higher more resource consuming state to a lower less resource consuming state, a wireless terminal may be required to transition from one UE/RRC state to another UE/RRC state upon expiration of a timer. The timer may be activated or initiated by some UE-related network activity, e.g. forwarding of an IP packet to/from the UE. The timer may expire due to some UE-related inactivity, e.g., no IP packet forwarded to/from the UE. Expiration of the timer may prompt the transition from one UE/RRC state to another UE/RRC state. Transfer to a state of higher activity is normally transmission-triggered, e.g., by the filling of a buffer.

There are problems with existing ways of governing transitions between the UE/RRC states. For example, legacy solutions govern the transition between UE/RRC states essentially statically, e.g., using fixed timer values, and therefore do not adapt the timers or the transitions according to the characteristics of the data flow. Such static setting does not allow cost optimal decisions for transferring between UE/RRC states, nor does it allow for adapting the cost optimal decision point to the load situation in the network. Such static setting results in suboptimal operation with regard to parameters such as UE battery consumption and network resource consumption. These problems have been particularly accentuated in UTRAN with the increasing amount of bursty packet data traffic in mobile networks generating a high control plane load due to frequent state transitions.

Furthermore, when a wireless terminal in UTRAN finishes data transmission/reception in the CELL_DCH state, after a shorter period of inactivity the wireless terminal is switched down to the CELL_FACH state, and after another period of inactivity the wireless terminal is further switched down, e.g., to URA_PCH state or IDLE. There are several problems with this approach.

As one such problem, CELL_FACH is used as a transient state, which means that wireless terminals are switched down to this state due to inactivity and not because they have data with characteristics suitable to transmit in this state. These wireless terminals will either be switched up to CELL_DCH again when a data burst arrives or, if no data transmission takes place, the wireless terminals are switched down further. Both change of a UE/RRC state and residing in a UE/RRC state contributes to the load on the network, e.g., on the radio network controller (RNC). Inefficient state switching thus increases the RNC load.

As another such problem, low rate services may also occupy unnecessary network resources if residing on CELL_DCH when CELL_FACH is a more efficient state.

SUMMARY

In one of its aspects the technology disclosed herein concerns a node for controlling transitions between radio resource control states for a wireless terminal in a radio access network, the radio resource control states comprising a first state and a second state. The node comprises a capacity manager and a radio resource manager. The capacity manager is configured to monitor a network condition of the radio access network. The radio resource manager is configured to make a decision whether to make a transition from the first state to the second state by determining whether (1) a cost of remaining in the first state is greater than (2) a cost of switching to the second state, and wherein the radio resource manager is configured to take the network condition into consideration when making the decision.

In an example embodiment wherein the network condition comprises a network congestion situation, the capacity manager is configured to provide congestion information regarding the network congestion situation on one or more channels of the radio access network to the radio resource manager and the radio resource manager is further configured to take the congestion information into consideration when making the decision.

In an example embodiment wherein the network condition comprises load in the node, the capacity manager is further configured to provide load information regarding the load in the node to the radio resource manager, and the radio resource manager is further configured to take the load information into consideration when making the decision.

In an example embodiment and mode, determining whether (1) a cost of remaining in the first state is greater than (2) a cost of switching to the second state is based on expected idle time between bursts.

In an example embodiment the radio resource manager is configured to make the decision whether to make the switch essentially immediately and upon termination of the burst if the expected idle time between bursts is greater than an ITB_threshold, the ITB_threshold being set to a time interval at which the cost of remaining in the first state is equal to the cost of switching to the second state.

In an example embodiment the radio resource control states include at least a CELL_DCH state; a CELL_FACH state, a URA_PCH state, and a CELL_PCH state, the first state being either the CELL_DCH state or the CELL_FACH state and the second state being either the URA_PCH state or the CELL_PCH state.

In another of its aspects the technology disclosed herein concerns a method in a node for controlling transitions between radio resource control states for a wireless terminal in a radio access network, the radio resource control states comprising a first state and a second state. In an example embodiment and mode the method comprises determining a network condition in the radio access network; making a decision whether to make a transition from the first state to the second state by determining whether (1) a cost of remaining in the first state is greater than (2) a cost of switching to the second state, and taking the network condition into consideration when making the decision; and, directing the wireless terminal either to remain in the first state or switch to the second state in accordance with the decision.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3A-FIG. 3D are schematic views of portions of example radio network controller nodes according to differing example embodiments of the technology disclosed herein.

DETAILED DESCRIPTION

Figure 1:
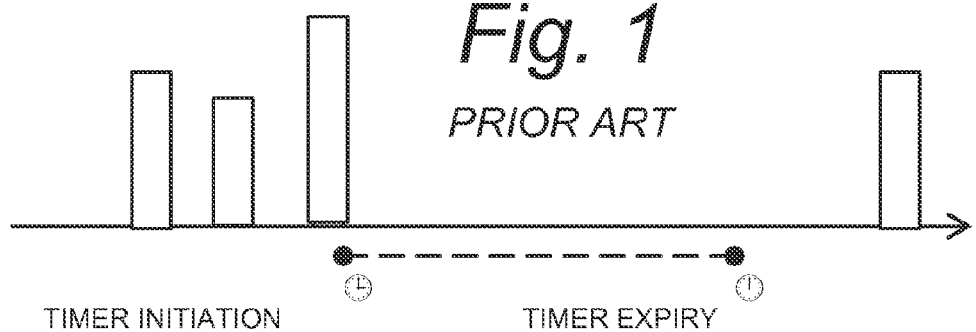
FIG. 1 is a diagrammatic view depicting conventional timer operation relative to the sending and receiving IP packets.

In the following description, for purposes of explanation and not limitation, specific details are set forth such as particular architectures, interfaces, techniques, etc. in order to provide a thorough understanding of the present disclosure. However, it will be apparent to those skilled in the art that the present disclosure may be practiced in other embodiments that depart from these specific details. That is, those skilled in the art will be able to devise various arrangements which, although not explicitly described or shown herein, embody the principles of the present disclosure and are included within its spirit and scope. In some instances, detailed descriptions of well-known devices, circuits, and methods are omitted so as not to obscure the description of the present embodiments with unnecessary detail. All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being hardware-implemented and/or computer-implemented, and thus machine-implemented.

In terms of hardware implementation, the functional blocks may include or encompass, without limitation, digital signal processor (DSP) hardware, reduced instruction set processor, hardware, e.g., digital or analog, circuitry including but not limited to application specific integrated circuit(s) (ASIC), and, where appropriate, state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Figure 2:
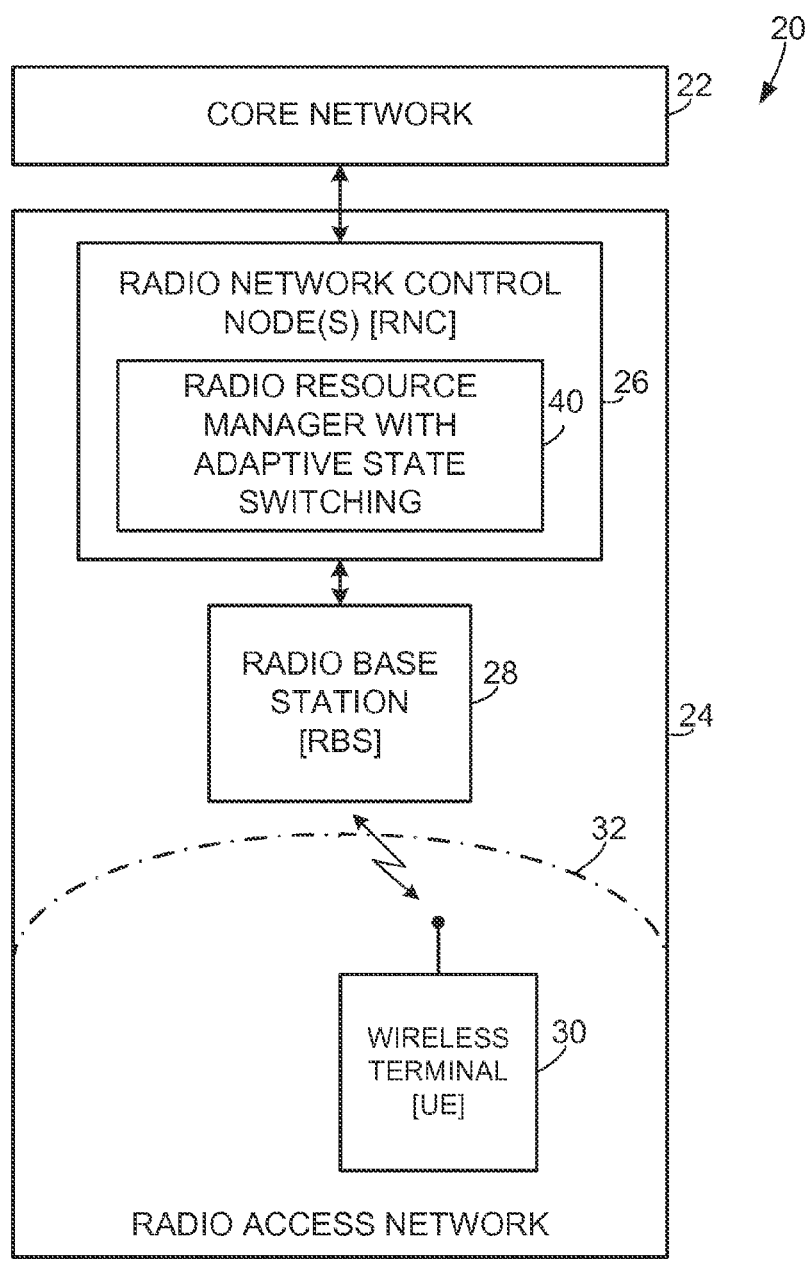
FIG. 2 is a simplified schematic view of an example communications network comprising a radio network controller node having an adaptive state switching radio resource manager.

FIG. 2 illustrates an example communications network 20 which comprises core network 22 and radio access network 24. As understood from the foregoing, in an example embodiment radio access network 24 comprises one or more radio network controller nodes (RNC) 26 and one or more radio base station nodes (RBS) 28. A wireless terminal 30 communicates with the radio base station node 28 over a radio or air interface 32.

The wireless terminal can be called by other names and comprise different types of equipment. For example, the wireless terminal can also be called a mobile station, wireless station, or user equipment unit (UE), and can be equipment such as a mobile telephone ("cellular" telephone) and a laptop with mobile termination, and thus can be, for example, portable, pocket, hand-held, computer-included, or car-mounted mobile devices which communicate voice and/or data with the radio access network.

As further shown in FIG. 2, radio network controller node 26 comprises radio resource manager 40, which is generic to all embodiments described herein. The radio resource manager 40 of the technology disclosed herein is characterized as providing dynamic UE/RRC state switching, and accordingly is also known as adaptive state switching radio resource manager 40.

Portions of an example embodiment of radio network controller node 26A, and more details of an example adaptive state switching radio resource manager 40A, are shown in FIG. 3A. For example, FIG. 3A shows radio network controller node 26A as comprising traffic input interface 42 and traffic output interface 44, as well as traffic buffer(s) 46 connected there between. In addition, radio network controller node 26A, as with other embodiments of radio network controller nodes encompassed hereby, comprises signaling interface 48 through which the result of a decision, e.g., whether to remain in a first state or switch to another or second state, is communicated to the wireless terminal 30, shown in FIG. 2.

The traffic input interface 42, traffic buffer(s) 46, and traffic output interface 44 are illustrated in generic fashion since traffic direction, e.g., the flow of user traffic, can be either in a downlink direction from core network 22 and through radio network controller node 26A and radio base station node 28 toward wireless terminal 30, or in an uplink direction from wireless terminal 30 and through radio base station node 28 and radio network controller node 26A to core network 22. Thus, when considering the traffic downlink direction, traffic input interface 42 is an interface to core network 22 and traffic output interface 44 is conceptualized as being an interface toward radio base station node 28. On the other hand, when considering the traffic uplink direction, traffic input interface 42 is conceptualized as being an interface toward radio base station node 28 and traffic output interface 44 is an interface to core network 22.

FIG. 3A further shows radio network controller node 26A as comprising traffic flow monitor 50. In an example embodiment, traffic flow monitor 50 is connected to observe the traffic flow, e.g., traffic flow through traffic buffer(s) 46. In an example embodiment, traffic flow monitor 50 is particularly suited for monitoring internet protocol (IP) traffic flow, e.g., IP packets that flow through radio network controller node 26A. In observing traffic flow, traffic flow monitor 50 may serve to determine existence of a burst of packets, burst length, burst size, idle time between bursts (ITB), and inter-arrival time (TAT), as described herein. The traffic flow monitor 50 may further be configured to provide estimates of the ITB, so called Expected Idle Time between Bursts (EITB) to the Radio Resource Manager (RRM) 40A.

It will be appreciated that the FIG. 3A example and other example embodiments of radio network controller nodes herein described or encompassed comprise other units or functionalities known to the person skilled in the art. For example, radio network controller nodes typically include handover functionality and diversity functionality, e.g., combining and splitting capabilities.

FIG. 3A particularly shows example details of adaptive state switching radio resource manager 40A. The adaptive state switching radio resource manager 40A of FIG. 3A comprises switch state decision unit 52A. The switch state decision unit 52A triggers transitions between UE/RRC states with an objective to minimize cost. In so doing, the switch state decision unit 52A defines a decision threshold as a point at which the cost for staying in a first state equals the transition cost to another state, e.g., second state, and back again, or phrased alternatively, a point at which the cost for staying equals the cost for switching.

Figure 4:
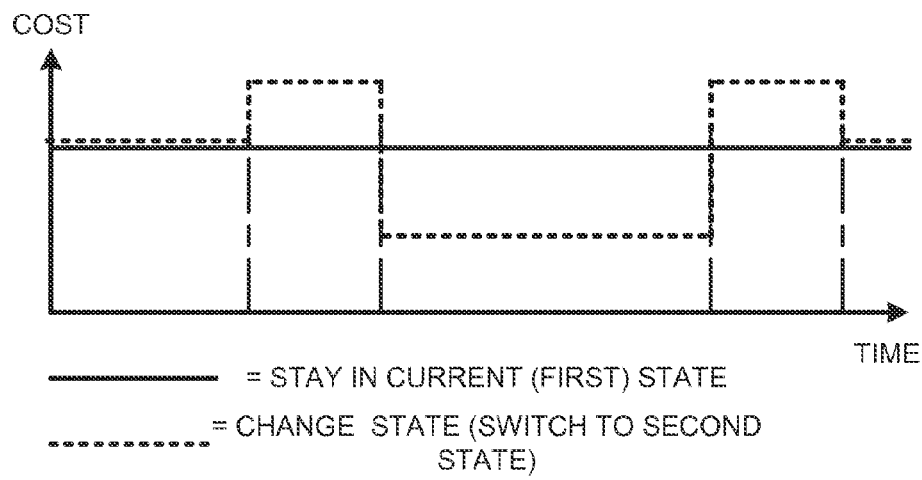
FIG. 4 is a graph illustrating cost over time for two different scenarios, e.g., the cost of staying in the first state and the cost for switching to another or second state.

The switch state decision unit 52A thus makes a decision whether to stay in a first state or switch to another or second state. Generically the decision made by switch state decision unit 52A is reflected by Expression 1:

IF Cost for staying≤Cost for switching THEN Stay in current state ELSE Switch to new state    Expression 1:

FIG. 4 illustrates cost over time for two different scenarios: the cost of staying in the first state, represented by the solid line, and the cost for switching to another or second state, represented by the broken line. The total cost for each scenario is depicted by the area under the respective lines.

The switch state decision unit 52A is driven by the IP traffic generated per wireless terminal, e.g., per UE, as determined and/or reported, e.g., by traffic flow monitor 50 based on the characteristics of the IP traffic, i.e. the burstiness. Knowing costs to stay in a state or switch to a new state, and the mobility behavior of the wireless terminal in a situation in which the cost could be dependent on mobility behavior of the wireless terminal, the switch state decision unit 52A may make a decision either to transition the wireless terminal (UE) from a first UE/RRC state to another or second UE/RRC state or to remain in the original or first UE/RRC state, in order to minimize the cost. As used herein, "cost" encompasses and/or comprises resources, such as network resources and/or wireless terminal resources. "Characteristics of the IP traffic" include, but are not limited to, such parameters as burst length, burst size, bit rate, and idle time between bursts.

The cost may be determined from the expected time in a UE/RRC state where the cost per time unit is known or derived. As used herein, "expected time" may be, for example, expected time to a new burst in the UE/RRC state. In an example embodiment and mode, the cost for staying in a state may be determined in accordance with Expression 2 and the cost for switching to a new state and back again may be determined in accordance with Expression 3. From these expressions it may be understood that the "cost in current state" and "the cost in new state" are costs that have been determined per time unit.

Cost_for_staying=Cost in current state×Expected Time in current state    Expression 2:

Cost_for_switching=Cost for state switches+Cost in new state×Expected Time in new state    Expression 3:

In an example embodiment, the cost of switching to the second state has three aspects: (1) the cost of switching from the first state to the second state; (2) a cost of at least temporarily remaining in the second state; and, (3) a cost of switching back from the second state to the first state. In terms of Expression 3, the Cost for state switches may comprise the first and third of these aspects, each aspect being a separate component of the Cost for state switches.

The cost for staying in a UE/RRC state or switching between UE/RRC states may be expressed in various ways. For example, cost for staying in a UE/RRC state or switching between UE/RRC states may be expressed in terms of UE resource consumption or network resource consumption. UE resource consumption may be expressed, for example, as UE battery consumption. Expression 4 provides a general example of how cost related to UE battery consumption for staying in a certain state may be expressed. Expression 5 provides a general example of how cost related to UE battery consumption for switching from a first state to a second or new state may be expressed.

UE_resource_cost_staying=Battery cost in current state×Expected Time in current state    Expression 4:

UE_resource_cost_switching=Battery cost for state switches+Battery cost in new state×Expected Time in new state    Expression 5:

In an example embodiment, various costs may be stored in a memory, e.g., a table, of radio network controller node 26A. As explained earlier, costs that are to be multiplied by an expected time in a state are given per time unit. To this end, FIG. 3A shows switch state decision unit 52A as comprising cost evaluator 54, which in turn comprises cost data section 55, which may be a memory. The cost data section 55 is shown as comprising UE battery utilization data 56. In an example embodiment, UE battery utilization data 56 comprises a listing or table which comprises battery consumption or utilization data for different UE/RRC states, e.g., the Battery cost in current state, e.g., one UE battery consumption value for CELL_DCH state, possibly another UE battery consumption value for CELL_FACH state, and so forth. The values may differ for different types of wireless terminals. In similar manner, the UE battery utilization data 56 may comprise a listing or table which comprises battery consumption or utilization data for switching between different states, e.g., Battery cost for state switches, e.g., one UE battery consumption value for switching from the CELL_DCH state to the CELL_FACH state, possibly another UE battery consumption value for switching from the CELL_FACH state to the URA_PCH state, and so forth. Thus, the radio resource manager 40A may comprise a battery power utilization table for plural types of wireless terminals, and for each type of wireless terminal the table comprises battery power utilization values for plural states and transitions between various states.

Network resource consumption may be expressed as, e.g., processing capacity consumption, RF power consumption, or other network resource consumption. Expression 6 provides a general example of how cost related to network resource consumption for staying in a certain state may be expressed. Expression 7 provides a general example of how cost related to network resource consumption for switching from a first state to a second or new state may be expressed. Again it is to be understood that costs that are to be multiplied by an expected time in a state are given per time unit.

NW_resource_cost_staying=(Resource cost in current state)×Expected Time in current state=(Event cost in current state×Event intensity in current state)×Expected Time in current state    Expression 6:

The event intensity in the current state may be dependent on, e.g., UE mobility. For example, if the mobility of the UE or wireless terminal is high, the intensity of signaling events related to Handover can be expected to be higher than if the mobility of the UE or wireless terminal is low. This is at least one reason why knowledge concerning UE mobility may be beneficial to a state change decision. That is, cost may be based on measurement of some event intensities. Some of these events may be dependent on the mobility of the wireless terminal $$NW\_resource\_cost\_switching=(\text{Resource cost for state switches})+(\text{Resource cost in new state})\times \text{Expected Time in new state}=(\text{Event cost for state switches})+\text{Event cost in new state}\times\text{Event intensity in new state})\times\text{Expected Time in new state} \quad \text{Expression 7:}$$

In some example embodiments, a value for the network resource consumption is primarily assigned or dependent upon which one of the UE/RRC states the wireless terminal is in. For example, for a wireless terminal which remains in a particular state, a certain network resource consumption value, i.e. cost, may be assigned for a wireless terminal primarily dependent on which one of the UE/RRC states the wireless terminal is in. In fact, in an example embodiment the resource consumption value may be dynamically assigned, e.g., monitored and updated by a radio resource manager dependent on mobility of the wireless terminal UE. For example, a first resource consumption value may be assigned for a wireless terminal in the CELL_DCH state, and another network resource consumption value may be assigned for the wireless terminal when in the CELL_FACH state, where the resource consumption values may be defined relative to each other. Similarly for state switching, a value for the network resource consumption may be primarily assigned or dependent upon which particular state transition occurs. For example, there may be different network resource consumption value for a switch from the CELL_DCH state to the CELL_FACH state than a switch from the CELL_DCH state to the URA_PCH state.

In some example embodiments, the network resource consumption in a state or during a transition is dependent upon one or more events rather than just which one of the UE/RRC states the wireless terminal is in. In this regard, one or more different types of events may occur or be executed while the wireless terminal is in a certain state, or when the wireless terminal switches from a first state to a second state. Events may be activities or tasks that are performed as a result of remaining or staying in a certain state, or that are performed as part of the switch from one state to another state, e.g., from the first state to the second state. For example, an event may be related to signaling between the wireless terminal and the network, signaling within the network, or other internal processing in the network. Various events may have different intensities, e.g., differing number of occurrences, depending on which state is occupied or which states are involved in the state switch. Thus, based on Expression 6 and Expression 7, the cost related to network resource consumption may be expressed or be determined as a sum of contributions from the included events and their respective event intensities.

As shown in FIG. 3A, cost data section 55 of radio resource manager 40A includes node processing capacity utilization information 58. The node processing capacity utilization information 58 may store the information necessary for evaluating Expression 6 and Expression 7. As an example, for determination of cost related to network resource consumption according to Expression 6 the Resource cost in current state for each state and/or respective Event costs in current state and Event intensities in current state for events included in each state may be stored, whereas for determination of cost related to network resource consumption according to Expression 7 the Resource cost for state switches, the Resource cost in new state and/or respective Event costs for state switches, Event costs in new state and Event intensities in new state for events included in each state may be stored, etc. Each state here means each state for which it is relevant to determine a network resource cost for staying in the state and/or for switching to or from the state.

Thus, in some embodiments the costs may comprise several components. That is, the Cost in current state, the Cost for state switches, and the Cost in new state may have one or more components. Accordingly, to determine an overall Cost_for_staying based on Expression 2 and an overall Cost_for_switching based on Expression 3, different components contributing to or influencing a respective one of Cost in current state, Cost for state switches, and the Cost in new state may need to be added together to get the overall cost. In an example embodiment, values for evaluating Expression 6 and Expression 7 may be configured at the radio network controller node 26A in the node processing capacity utilization information 58. For example, the various event costs may be or may comprise static information configured in the node, and as such is essentially directly available when needed and thus need not necessarily be evaluated or determined anew at each occasion. In another example embodiment, the values stored in node processing capacity utilization information 58 dynamically determined, e.g., derived in run time. For example, the values for node processing capacity utilization information 58 may be derived or determined based on node internal measurements.

As mentioned above, network resource consumption may be expressed as processing capacity consumption, which may be quantified as or associated with a percentage of node processing capacity utilization. Thus, the radio resource manager 40A may determine a percentage of node processing capacity utilization for the wireless terminal for each given state, and the percentage of node processing capacity utilization required for a transition or switch from a first state to another or second state. As stated above, such percentage determinations may either be static, e.g., configured in node processing capacity utilization information 58, or adaptive, e.g., dynamically changeable based on node internal measurements.

The event intensities such as those referenced in Expression 6 and Expression 7 may be derived for an average wireless terminal in the network or network node, or be measured and derived per individual wireless terminal. The event intensity data may also be stored, after configuration or dynamic determination, in node processing capacity utilization information 58. Specifically for UTRAN the state transitions may concern the states CELL_DCH, CELL_FACH, CELL_PCH and URA_PCH.

As used herein, the cost for staying in, e.g., state A may be written as Expression 8.

$$C\_A \qquad \qquad \text{Expression 8:}$$

As used herein, the cost for switching from e.g. state A to state B, may be written as Expression 9.

$$C\_AB \qquad \qquad \text{Expression 9:}$$

A decision threshold (ITB threshold) can be derived from the special case when cost of staying equals cost of switching, i.e. C_A=C_AB. This means that the decision threshold, also denoted ITB threshold, is the time interval between a first burst and a next burst, for which the cost for staying in state A is equal to the cost for switching from state A to state B at cessation of the first burst and then switching back from state B to state A at beginning of the next burst.

ITB is the Idle Time Between Bursts, e.g., the time from the departure of the last packet in a burst until the arrival of the first packet in the next burst.

If expected time to next burst, EITB, exceeds the ITB threshold, then the cost for staying is larger than the cost for switching. Similarly if the EITB is less than the ITB threshold the cost for staying is less than the cost for switching. Thus switching based on an ITB threshold implies switching based on cost. The switching decision can be written as in Expression 10. EITB stands for Expected Idle Time between Bursts.

Figure 5:
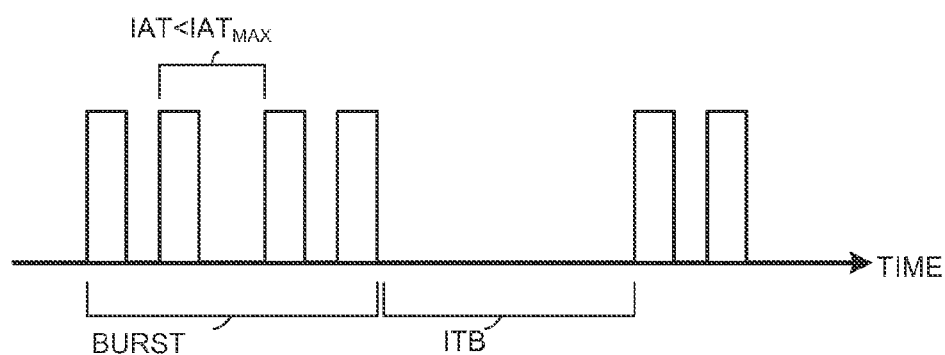
FIG. 5 is a diagrammatic view depicting, e.g., a burst, maximum inter-arrival time (IATmax) between packets of a burst, and idle time between bursts (ITB).

Expression 10: IF EITB > ITB threshold
THEN Switch to new state
ELSE Stay in current state As shown in FIG. 5, a burst is defined by IP packets arriving with a maximum inter-arrival time (IATmax). The switch state decision unit 52 of radio resource manager 40A makes its decision, e.g., whether to remain in a state or switch states, after cessation of transmission of each burst, regardless of whether the burst be on the uplink from the wireless terminal to the network or on the downlink from the radio access network to the wireless terminal. The decision made by the switch state decision unit 52 upon cessation of transmission of each burst is thus a decision regarding which state is appropriate for the wireless terminal until the next burst.

The decision threshold whether to switch from a first state to another or second state, or to stay or remain in a particular state, may be determined from the measured average time between bursts of IP packets (average idle time between burst (AITB)).

In the example embodiment of FIG. 3A, the traffic flow monitor 50 may measure the time of packets arriving in traffic buffer(s) 46 and determine cessation of the transmission of the burst. In such case, and as explained with reference to FIG. 5, the traffic flow monitor 50 determines a burst as comprising IP packets which arrive within the maximum inter-arrival time.

An advantage of the switch state decision unit 52A of FIG. 3A is execution of UE/RRC state transitions in a mobile network in a manner to minimize the cost, on an individual wireless terminal basis, in terms of resource consumption, e.g., network resource consumption or wireless terminal resource consumption, which is not possible with the state of the art mechanisms.

When a wireless terminal, e.g., a UE moves around in a network, a message is sent to the RNC node indicating whether the wireless terminal needs to, e.g., go to a new cell or to add connection to a new cell in the network. That message can be counted by the RNC to tell the level of mobility of the wireless terminal, and this information can come from a handover unit, e g in the RNC node. FIG. 3A depicts by symbol 53 that such mobility data may be an input to switch state decision unit 52A. Thus, cost may be based on measurement of event intensities and some of the event intensities, such as the intensity at which the message mentioned above is received at the RNC node, may be dependent on mobility of the wireless terminal (UE).

Portions of another example embodiment of radio network controller node 26B and more details of an example adaptive state switching radio resource manager 40B suitable for such another embodiment are shown in FIG. 3B. As understood with reference to the previously described embodiment of the radio network controller node 26A of FIG. 3A, the radio network controller node 26B of the embodiment of FIG. 3B comprises traffic input interface 42; traffic output interface 44; traffic buffer(s) 46; signaling interface 48; and traffic flow monitor 50. The radio network controller node 26B also comprises switch state decision unit 52B.

In addition, the radio network controller node 26B of FIG. 3B is shown as comprising capacity manager 60. The capacity manager 60 serves to monitor or determine a network condition. As used herein, "network condition" comprises at least one of network congestion, i.e., the network congestion situation in the network, and load in the node, e.g., in the radio network controller node 26B. "Network congestion information" or "congestion information" may refer to an indicator or information regarding the network congestion situation in the network. Load in the node is taken into consideration on two levels: (1) to determine what parameter/aspect should be assessed when determining cost, and (2) it may itself be a parameter/aspect assessed to determine the cost. As a result of monitoring or determining the network congestion situation in the radio access network, in an example embodiment capacity manager 60 provides congestion information 62 to radio resource manager 40B, and as a result of monitoring or determining load in the network node, e.g., in radio network controller node 26B, the capacity manager may provide load information 63 to the radio resource manager 40B. In an example embodiment the congestion information affects all switching decisions. In an example embodiment the load information 63 affects at least one particular decision, e.g., switch to URA_PCH.

Like the radio resource manager 40A of the FIG. 3A embodiment, the radio resource manager 40B makes a decision whether to make a switch between the states by determining whether (1) a cost of remaining in a first state is greater than (2) a cost of switching to a second state. As used herein, "switching to a second state" encompasses at least temporarily residing in the second state. As reflected by act 6-2 of FIG. 6, the radio resource manager 40B is additionally configured to take network congestion into consideration when making the decision. For example, the cost evaluator 54 of the radio resource manager 40B comprises memory or storage for congestion information 62. The congestion information 62 may be supplied with information, e.g. congestion indications, from capacity manager 60.

As such, the radio resource manager 40B of the embodiment of FIG. 3B allows the mobile telecommunications system to operate towards an optimization objective adapted to the current traffic scenario. For example, and as illustrated by way of example in FIG. 7, the system may operate to minimize the wireless terminal resource consumption or UE resource consumption when the resource consumption or load in the network is low and operate to minimize the network resource consumption when the resource consumption (load) in the network is high, as described above. The technology of this and other embodiments is general to any mobile telecommunications standard employing transitions between states like UE/RRC states.

It should be understood that the radio resource manager 40B of the embodiment of FIG. 3B is based on the radio resource manager 40A of FIG. 3A and that previously described details of the radio network controller node 26A are applicable to the radio network controller node 26B as well. For example, the characteristics of the IP traffic flow, i.e. the burstiness, known costs to stay in a state or switch to a new state, and the mobility behavior of the wireless terminal may be taken into consideration when making a decision, e.g., a cost-minimizing decision, whether to transition the wireless terminal to another UE/RRC state, e.g., "switch" to another UE/RRC state.

Moreover, as in the FIG. 3A embodiment, the decision of the radio resource manager 40B of the FIG. 3B embodiment as to whether or not to perform a UE/RRC state transition may be governed by an overall objective such as (1) to minimize the UE resource consumption, e.g. battery consumption of the wireless terminal; or (2) to minimize the network resource consumption, e.g. processing load, or RF power consumption. The state transition decision may be trigged by certain criteria being met based on the characteristics of the IP flow. The criteria may depend on whether the objective is to minimize wireless terminal resource consumption ($C_{UE, State}$) or whether the objective is to minimize the network resource consumption ($C_{NW, State}$). Furthermore the criteria may be wireless terminal specific dependent on the mobility related signaling generated by the wireless terminal and be dependent on the current state.

Figure 6:
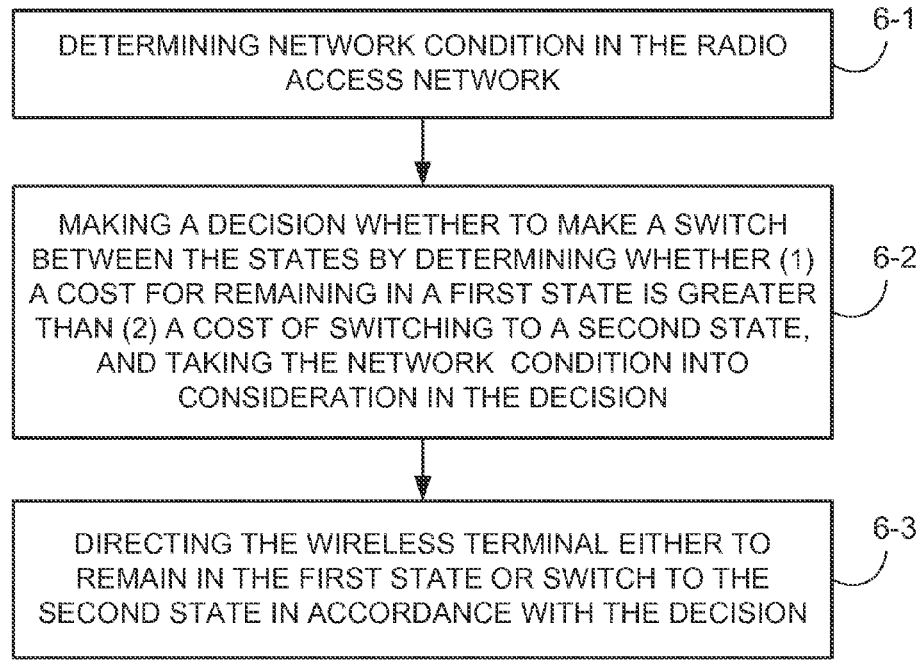
FIG. 6 is a flowchart depicting example acts or steps involved in a method of operating a node of a radio access network which controls transitions between radio resource control states for a wireless terminal.

FIG. 6 depicts certain example acts or steps involved in a method of operating a node of a radio access network which controls transitions between radio resource control states for a wireless terminal, such as the radio network controller node shown in FIG. 3B. Act 6-1 comprises the node determining a network condition in the radio access network. As indicated above, "network condition" is at least one of network congestion and load in the node 26B. In the example embodiment of FIG. 3B act 6-1 may be performed by capacity manager 60. Act 6-2 comprises the node 26B making a decision whether to make a switch between the states. As stated above, the decision is made by determining whether (1) a cost of remaining in a first state is greater than (2) a cost of switching to a second state, and by taking the network condition into consideration when making the decision. In particular, the cost evaluator 54 may employ the congestion information 62 which may be obtained from capacity manager 60. Act 6-3 comprises the node 26B directing the wireless terminal 30 either to remain in the first state or switch to the second state in accordance with the decision. The signaling interface 48 of the radio network controller node 26B may be employed for communicating the decision to the wireless terminal 30. For example, as act 6-3 the node 26B may direct the wireless terminal 30 to switch to the second state if the decision of act 6-2 is to switch to the second state. Thus, execution of act 6-3 need not occur after every decision, e.g. it need not occur if the result of the decision is to remain in the first state. That is, only a change of state decision need be communicated to wireless terminal 30, it being understood that no change of state decision means that the wireless terminal 30 remains in its existing state, e.g., the first state.

Figure 7:
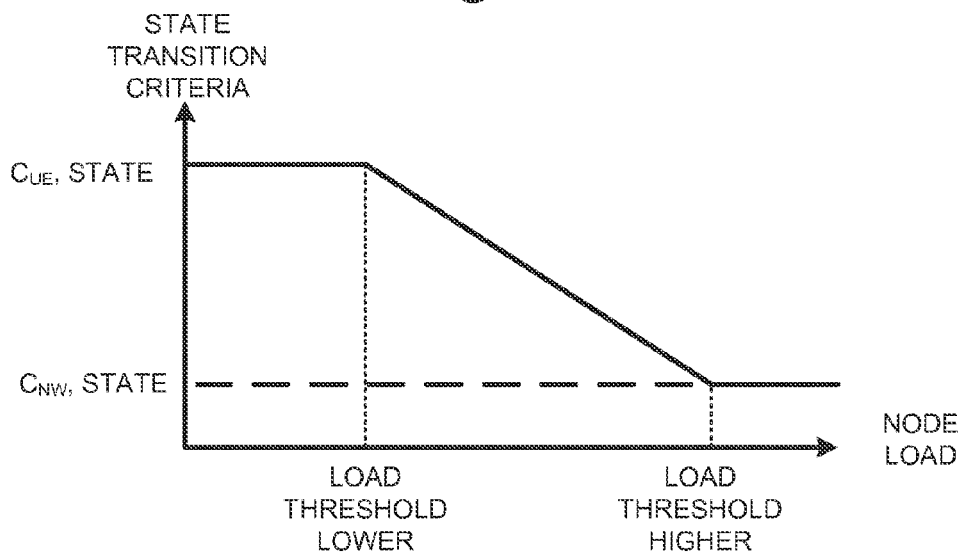
FIG. 7 is a graph illustrating adaptation of state transition criterion dependent on node load according to an example implementation.
Figure 8:
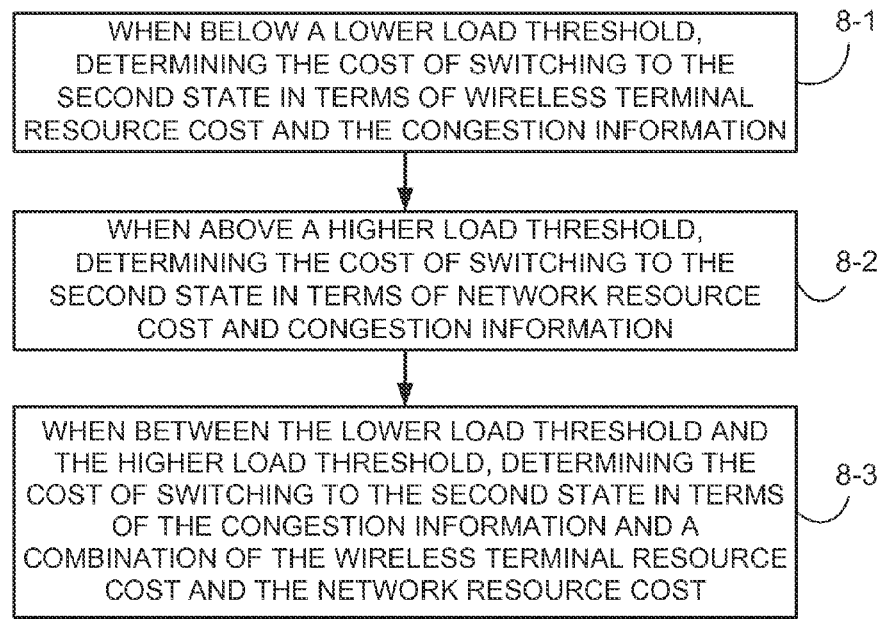
FIG. 8 is a flowchart depicting example sub-acts or sub-steps involved in the method of FIG. 6 when operating in accordance with the example implementation of FIG. 7.

FIG. 7 illustrates an example, non-limiting implementation of how the decision of act 6-2 may be based, e.g., adaptively based, on network conditions, e.g. measured load, in accordance with the example sub-acts or sub-steps shown in FIG. 8. As shown in FIG. 7, at a node load below a lower load threshold the state transition is optimized to minimize wireless terminal resource consumption ($C_{UE, State}$). At a node load above an upper or higher load threshold the state transition is optimized to minimize network resource consumption ($C_{NW, State}$). Between the load thresholds the criterion/criteria for state transition is scaled, for example linearly scaled. Thus, act 8-1 of FIG. 8 comprises, when below a lower load threshold, denoted Load Threshold Lower (LTL), determining the cost of switching to the second state in terms of wireless terminal resource cost and the congestion information. Act 8-2 comprises, when above a higher load threshold, denoted Load Threshold Higher (LTH), determining the cost of switching to the second state in terms of network resource cost and congestion information. Act 8-3 comprises, when between the lower load threshold and the higher load threshold, determining the cost of switching to the second state in terms of the congestion information and a combination of the wireless terminal resource cost and the network resource cost. As understood with reference to FIG. 7, between the lower load threshold and the higher load threshold the combination may be a scaled combination of wireless terminal resource cost and network resource cost. Besides linear scaling, other scaling methods may also be possible. The determination of act 8-3 thus may comprise a second component, e.g., the "cost of switching to a second state", of act 6-2 of FIG. 2.

As used herein, the plural form of the word "criteria" is intended to encompass the singular form of the word, e.g., "criterion", as well in order to avoid repetition of the phrase criterion/criteria.

Furthermore the criteria for transition to a state may be adapted dependent on the available related resources, e.g., whether there is congestion or not. Typically the criteria for transition to a state will be biased to decrease the number of transitions to the state during the congestion situation. For UTRAN the state transition may concern the states CELL_DCH, CELL_FACH, etc.

The measurable criterion deciding a transition from state A to state B may be written as C_A>C_AB; the criterion minimizing network load may be written as C_A_NW>C_AB_NW; and the criterion minimizing UE battery consumption may be written as C_A_UE>C_AB_UE. Given such notation, an example of a state transition procedure or PROC1 algorithm is as described in PROC 1, where X represents either UE or NW. The PROC 1 procedure or algorithm may also be expressed with the ITB threshold, as shown by, e.g., Expression 10.

PROC 1:

```
IF UE in State A
THEN
    IF C_A_X > C_AB_X THEN goto State B
    ELSE Stay in State A
ENDIF
    Where C_AB_X may be derived as
        IF L ≥ LTH THEN
            C_AB_X = C_AB_NW
        ELSE IF L ≤ LTL THEN C_AB_X = C_AB_UE
        ELSE
            C_AB_X = C_AB_UE * (1−F) + F * C_AB_NW
    ■ F = (L − LTL) / (LTH − LTL)
    ■ L = Measured Processing Load
    ■ LTL = Load threshold Lower
    ■ LTH = Load Threshold Higher
```

The cost for staying in, e.g., state A or the cost for switching from e.g. state A to state B may be adjusted to combat congestion situations in order to direct wireless terminals or UEs to states that are not congested. This could be regarded as an offset factor or term D, also known as offset D, on the cost C_A_X for staying in state A if congestion has occurred or may occur in state A, or on the cost C_AB_X if congestion has occurred or may occur in state B, i.e., a new criterion for switching from state A to state B is formed, in the first case as C_A_X+D>C_AB_X and in the second case as C_A_X>C_AB_X+D. The offset D may be supplied by the capacity manager 60 of FIG. 3B or interpreted by congestion information 62 based on information supplied by capacity manager 60. For example, capacity manager 60 may report the amount of traffic and assign an offset value of, for example, 0 to 10, which offset value may be the offset D. Thus, in an example implementation the offset D may be a unit-less number that is assigned by capacity manager 60 based on the subjective factors that capacity manager 60 decides to use. In an example implementation, a certain offset may be tried, and if does not provide the desired response, the value of the offset D may be modified (e.g., increased), and so forth.

In an example embodiment wherein the network is UTRAN, the network node executing the state transitions is the radio network controller (RNC). The network load may be related to processing load in the node. Congestion may be related to congestion on the shared FACH or Enhanced-FACH channel for wireless terminals in state CELL_FACH. Congestion may be related to congestion on the DCH, HS-DSCH, or E-DCH channels for UEs in state CELL_DCH. Congestion may also be related to radio frequency (RF) Power for any UEs in any state. As mentioned above, the load may be measured in the network node, e.g., by capacity manager 60 of radio network controller node 26B, for example.

The radio resource manager 40B of the radio network controller node 26B of FIG. 3B advantageously allows the mobile telecommunications system to adapt UE/RRC state transition decisions to the network load condition, e.g., in order to minimize the network resource consumption when the network resource consumption is high, e.g., higher than the higher load threshold, and to minimize UE resource consumption when the network resource consumption is low, e.g., lower than the lower load threshold. This provides, e.g., a lower network resource consumption when needed and an overall longer wireless terminal battery life time, which is an improvement compared to the prior art static network configurations.

As mentioned above, the considerations of the embodiment of FIG. 3A, comprising and not limited to the Example Embodiments E1-E36 and Example Embodiments M1-M33 discussed below, are also applicable to and may comprise the embodiment of FIG. 3B and other embodiments described herein.

The example embodiment of FIG. 3B, illustrates, e.g., cost based selection between staying in a first state and switching from the first state to a second state where the network condition in form of node load and/or network congestion is taken into account when determining the costs, thereby having an impact on whether the decision is to switch or to stay. As a variant of the example embodiment of FIG. 3B, an Idle Time Between bursts (ITB) threshold is determined by determining the time interval between bursts at which the cost for staying is equal to the cost for switching. The cost based selection between staying in the first state and switching from the first state to the second state may then be implemented by comparing an Expected Idle Time between Bursts (EITB) to the ITB threshold. If EITB is less than the ITB threshold, the cost for staying is less than the cost for switching, so the decision is made to stay in the first state, etc. This particular variant of the example embodiment of FIG. 3B is depicted by inclusion of the Expected Idle Time between Bursts (EITB) information 79, the Expected Idle Time between Bursts (EITB) information 79 being illustrated in broken lines in view of its optional implementation. In a special case in which the node 26B is a radio network controller (RNC) node, the cost based switching can be applied for switching from CELL_DCH or CELL_FACH (first state) to CELL_PCH or URA_PCH (second state). In this specific embodiment there is also another principle for switching between CELL_DCH and CELL_FACH, and yet another principle for switching from CELL_PCH or URA_PCH, as depicted in the example embodiment of FIG. 3C.

Portions of another example embodiment of radio network controller node 26C and more details of an example adaptive state switching radio resource manager 40C suitable for such embodiment are shown in FIG. 3C. As understood with reference to the previously described embodiments, the radio network controller node 26C of the embodiment of FIG. 3C comprises traffic input interface 42; traffic output interface 44; traffic buffer(s) 46; signaling interface 48; and traffic flow monitor 50.

The radio resource manager 40C of the radio network controller node 26C of the embodiment of FIG. 3C comprises switch state decision unit 52C. The switch state decision unit 52C in turn comprises several sections or sub-units, each sub-unit being assigned or associated with one or more particular state transition decisions. For example, switch state decision unit 52C comprises (1) switch from first state to second state or stay on first state decision sub-unit 70; (2) switch between CELL_DCH and CELL_FACH decision sub-unit 72; and (3) switch from CELL_PCH/URA_PCH decision sub-unit 74. For the switch from first state to second state or stay on first state decision unit 70, the first state may be either CELL_DCH or CELL_FACH; and the second state may be either CELL-PCH or URA-PCH.

The switch from first state to second state or stay on first state decision sub-unit 70 comprises cost evaluator 54, which in turn comprises or has access to cost data such as battery utilization data 56 and node processing capacity utilization information 58, both of which have been described before. In general, cost evaluator 54 may be of an example embodiment having structural details such as that shown in FIG. 3B. The cost evaluator 54 also comprises, or has access to or utilizes, congestion information 62; load information 63; and expected idle time between bursts information 79. It should be understood that the switch from first state to second state or stay on first state decision sub-unit 70 could be allocated or distributed to plural sub-units, such as a separate sub-unit for deciding state changes and a separate sub-unit for deciding state stays, or alternatively as separate sub-units associated with differing ones of the states involved, e.g., CELL_DCH, or CELL_FACH as the first state, or CELL-PCH or URA-PCH as the second state, for example.

The switch from CELL_PCH/URA_PCH decision sub-unit 74 comprises, utilizes, or has access to congestion information 62 and burst size information 76. The switch between CELL_DCH and CELL_FACH decision sub-unit 72 comprises, utilizes, or has access to burst length information 75; burst size 76; bit rate information 77; bit rate information 77; and congestion information 62.

Figure 9:
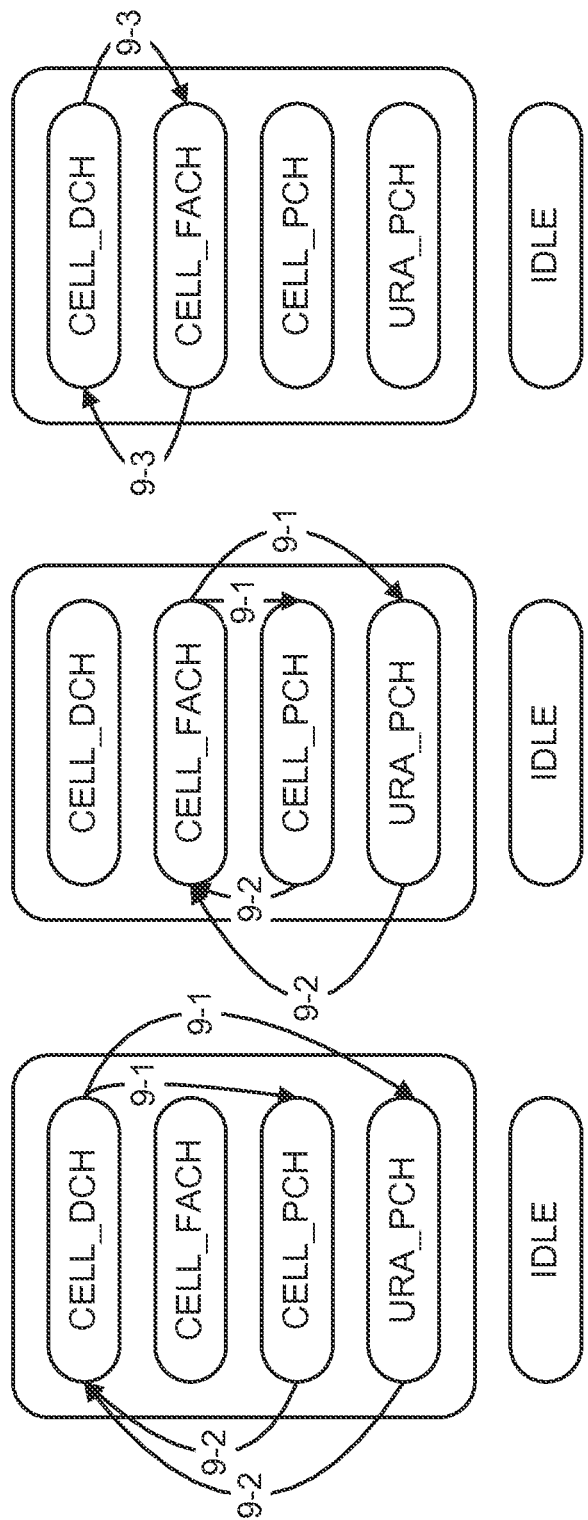
FIG. 9 is a diagrammatic view showing radio resource control states for which a radio resource manager of the embodiment of FIG. 3C controls state transitions.

The radio resource manager 40C of FIG. 3C is configured to use different decision criteria for making decisions whether to make a switch between various ones of the radio resource control states, e.g., the UE/RRC states, for a wireless terminal. As shown in FIG. 9, the radio resource control states include at least a CELL_DCH state; a CELL_PCH state, a CELL_FACH state, a URA_PCH state, and (optionally) an Idle state. For the example embodiment of FIG. 3C, the differing decision criteria comprise, e.g., among others: first decision criteria; second decision criteria; third decision criteria; and fourth decision criteria, as discussed below. The first decision criteria, represented by arrows 9-1 in FIG. 9, C_A>C_AB, implies a switch from A to B, where A=CELL_DCH/CELL_FACH and B=CELL_PCH/URA_PCH. The second decision criteria, represented by arrows 9-2 in FIG. 9, is a switch from CELL_PCH/URA_PCH. The third decision criteria, represented by arrow 9-3 in FIG. 9, is a switch between CELL_DCH and CELL_FACH. The fourth decision criteria, A<=C_AB, implies stay in A.

The first decision criteria involves a switch from either of the CELL_DCH state or the CELL_FACH state to the CELL_PCH state or the URA_PCH state. The first decision criteria is implemented by the switch from first state to second state or stay on first state decision sub-unit 70 and affects the transitions depicted by arrows 9-1 in FIG. 9. The decision sub-unit 70 accounts for or takes into consideration congestion information 62 and contains a sub-unit for handling node load information 63 which is input from capacity manager 60. The switch from first state to second state or stay on first state decision sub-unit 70 also takes into consideration Expected Idle Time between Bursts (EITB) 79. Expected Idle time between bursts is a way to realize cost based switching. The idle time between bursts (ITB) thresholds are calculated from the cost to stay and the cost to switch, i.e., an ITB threshold may be calculated as the time interval for which the cost to stay is equal to the cost to switch. The EITB may then be compared to the ITB threshold to determine whether the cost to stay is higher or lower than the cost to switch.

The second decision criteria involves a switch from either of the CELL_PCH state or URA_PCH state to either of the CELL_DCH state or the CELL_FACH state. The second decision criteria is implemented by switch from CELL_PCH/URA_PCH decision sub-unit 74 and affects the transitions depicted by arrows 9-2 in FIG. 9. The second decision criteria takes into consideration burst size 76 and congestion information 62.

The third decision criteria involves a switching between the CELL_DCH state and the CELL_FACH state. The third decision criteria is implemented by switch between CELL_DCH and CELL_FACH decision sub-unit 72 and affects the transitions depicted by arrows 9-3 in FIG. 9. The third decision criteria comprises at least one of burst length 75, burst size 76, bit rate 77, and congestion information 62, as explained below.

The fourth decision criteria concerns a decision to stay on either the CELL-DCH state or the CELL_FACH state. The fourth decision criteria is implemented by the switch from first state to second state or stay on first state decision sub-unit 70.

As understood from the foregoing and also illustrated in FIG. 9, the radio resource control states may further include an Idle state. If there is no URA_PCH state and no CELL_PCH state, cost based switching from CELL_DCH or CELL_FACH could be used to go to the Idle state.

Figure 10:
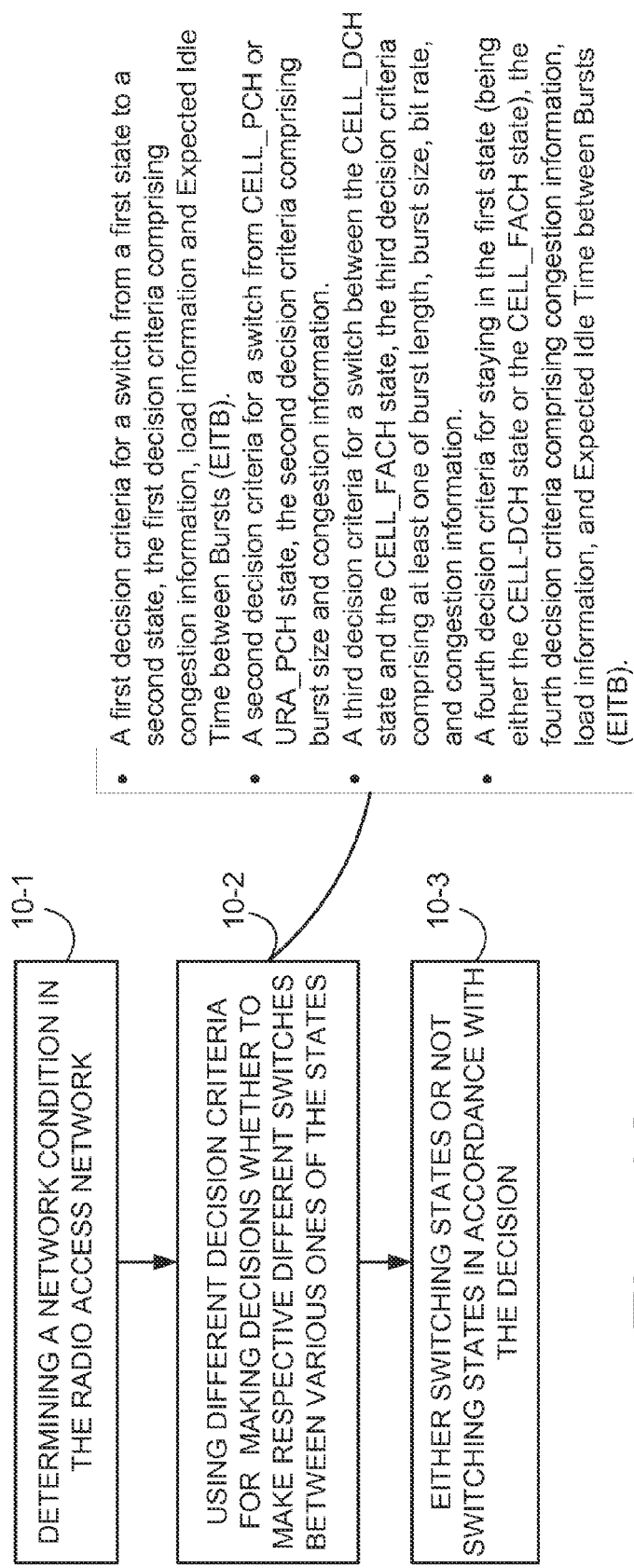
FIG. 10 is a flowchart illustrating example, non-limiting acts or steps included in a method of operating a radio network controller node according to the embodiment of FIG. 3C.

FIG. 10 illustrates example, non-limiting acts or steps included in a method of operating the radio network controller node 26C of the embodiment of FIG. 3C. Act 10-1 comprises determining a network condition in the radio access network. As explained previously with regard to radio resource manager 40B, the network condition may be determined by capacity manager 60 as a network congestion situation and/or a load in the node and may be communicated as congestion information 62 and/or load information 63. Act 10-2 comprises using different decision criteria for making decisions whether to make switches between various ones of the states. FIG. 10 further illustrates, as an offshoot of act 10-2, various different decision criteria, which are also discussed elsewhere herein. In an example embodiment, each of the different decision criteria employ the congestion information 62. Act 10-3 comprises either switching states or not switching states in accordance with the decision.

The switch between CELL_DCH and CELL_FACH decision sub-unit 72 only puts in CELL_FACH state those wireless terminals which have traffic characteristics suitable for CELL_FACH. In other words, switch between CELL_DCH and CELL_FACH decision sub-unit 72 triggers a switch from CELL_DCH to cell CELL_FACH for low intensity traffic, e.g., when the traffic for some reason has changed behavior and become low intensity, and to switch back to CELL_DCH when the traffic again changes behavior and can no longer be served on CELL_FACH. The only transitions needed between CELL_DCH and CELL_FACH are the ones due to changes in the traffic characteristics.

The switch between CELL_DCH and CELL_FACH decision sub-unit 72 of radio resource manager 40C is illustrated as having memories or storage locations for, e.g., the following parameters: burst length 75, burst size 76, and bit rate 77. According to switch between CELL_DCH and CELL_FACH decision sub-unit 72, the wireless terminals that are to be allocated on the RACH/FACH channel is determined by the their traffic flows characterized by these parameters, e.g., bit rate, burst size, and burst length. Thus, the decision executed by switch between CELL_DCH and CELL_FACH decision sub-unit 72 for a transition between CELL_DCH and CELL_FACH states is based on a combination of these parameters, e.g., burst size, burst length and bit rate, as opposed to decisions based on inactivity timers.

Thus, for the switch between CELL_DCH and CELL_FACH decision sub-unit 72, when the wireless terminal is on CELL_DCH or CELL_FACH, a transition to the other state, i.e., to CELL_FACH if current state is CELL_DCH or to CELL_DCH if current state is CELL_FACH, may be decided depending on the Bit Rate, the length of the current burst, and the Burst Size of the traffic flow.

Figure 11:
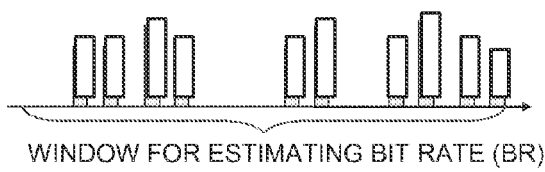
FIG. 11 is a diagrammatic view depicting a window for estimating bit rate according to an example embodiment and mode.

In the above regard, the burst size is defined as the sum of the sizes, in bits or bytes, of the IP packets included in the burst. As shown in FIG. 11, the window for defining the bit rate may cover several bursts. The bit rate may be defined as the sum of the bursts during the window divided by the time of the window. As understood with reference to FIG. 5, a burst may be defined by IP packets arriving with a maximum inter-arrival time ($IAT_{max}$).

In an example embodiment, the Bit Rate (BR) and the Burst Size (BS) can be estimated based on measurements. The Burst Length (BL) may be measured in run time. Such measurements of Bit Rate (BR), Burst Size (BS), and Burst Length (BL) may be made by traffic flow monitor 50 and communicated to switch between CELL_DCH and CELL_FACH decision sub-unit 72.

Figure 13A:
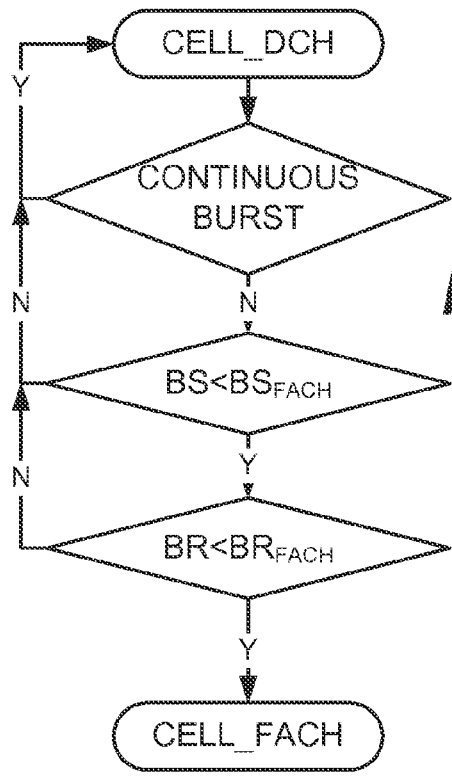
FIG. 13A and FIG. 13B are flowcharts illustrating example, representative acts or steps comprising methods for making state transitions based on burst size, burst length, and bit rate.
Figure 13B:
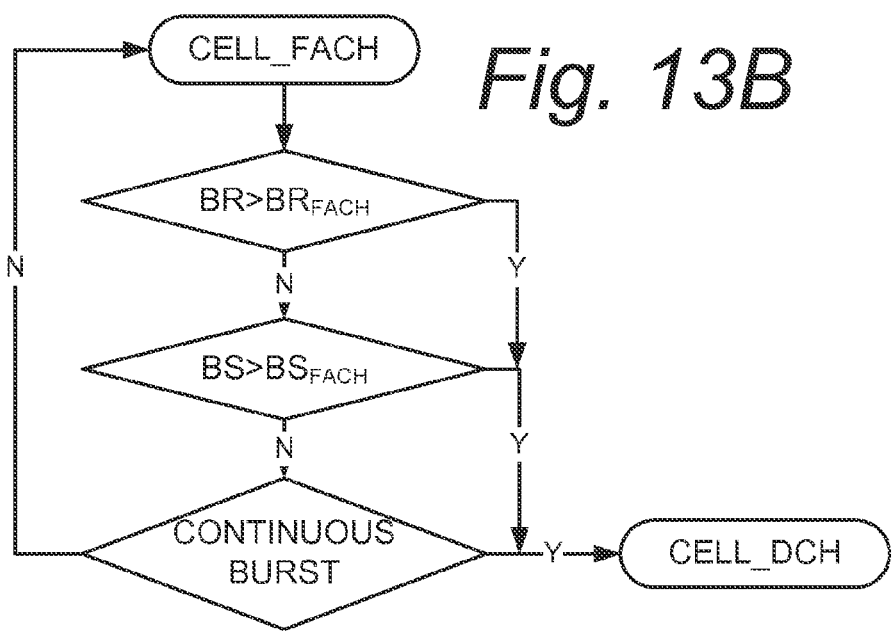

FIG. 13A and FIG. 13B are flowcharts illustrating example, representative acts or steps comprising methods for making state transitions based on burst size, burst length, and bit rate. As shown in FIG. 13A, if the Burst Size and the Bit Rate for a traffic flow transmitted in CELL_DCH decreases below defined thresholds, denoted burst size and bit rate thresholds respectively, the wireless terminal should be switched down to the CELL_FACH state. As shown in FIG. 13B, if the Burst Size, Burst Length, or the Bit Rate for a traffic flow transmitted in CELL_FACH, increases above defined thresholds, the wireless terminal should be switched up to the CELL_DCH state.

When deciding on a transition from CELL_DCH to CELL_FACH the size of the next burst is important, to avoid an immediate transition back again. The burst size and the bit rate thresholds should be chosen with regard to the capacity of the RACH/FACH channel associated with the CELL_FACH state. The levels of the estimated bit rate and burst size are dependent on the channel carrying the information, e.g. legacy RACH/FACH or Enhanced FACH.

If the Burst Length increases above a defined threshold, denoted burst length threshold, the traffic flow is seen as one continuous burst, e.g., a constant IP packet stream. This traffic characteristic applies to continuous services like VoIP. Such services may preferably be located on CELL_DCH, e.g., for latency or mobility reasons.

Compared to the state of the art, the switch between CELL_DCH and CELL_FACH decision sub-unit 72 advantageously provides better radio access network resource utilization and less control plane load from channel switching in the radio network controller (RNC).

The switch from first state to second state or stay on first state decision sub-unit 70 improves the state switching decision by utilizing information about the IP flow characteristics. With an estimation of how long the Idle Time between Bursts (ITB) is for a certain IP flow, the switch from first state to second state or stay on first state decision sub-unit 70 improves the decision to switch a user or wireless terminal to a different state by transferring the user or wireless terminal immediately when a burst is considered ended. FIG. 3C shows the switch from first state to second state or stay on first state decision sub-unit 70 as comprising a memory or storage area 79 for the Expected Idle Time between Bursts (EITB).

As shown in FIG. 5, within an IP flow there are typically times of activity and times of inactivity. Periods of activity will be separated by times of inactivity of different length. Within the IP flow, a burst can for example be defined by IP packets arriving with a predefined maximum inter-arrival time ($IAT_{max}$) as shown in FIG. 5. It is possible that ITB is also known by other measures, such as knowing the application generating the IP flow. The Idle Time Between bursts (ITB) is defined as the time between the last packet in one burst and the first packet of the next. With the information about ITB for a certain IP flow, the decision to stay or switch can be done more efficient. Such decision, however, should not be implemented until both the uplink and the downlink transmissions have been considered, e.g., a switch should not occur before an acknowledgement (ACK or NACK) has been received, e.g., on the uplink.

Figure 12A:
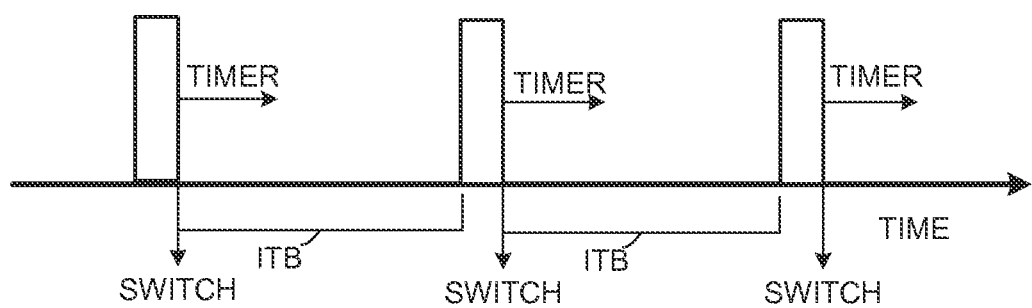
FIG. 12A and FIG. 12B are diagrammatic views of differing cases in which switching decisions are made based on idle time between bursts (ITB) rather than on timers.
Figure 12B:
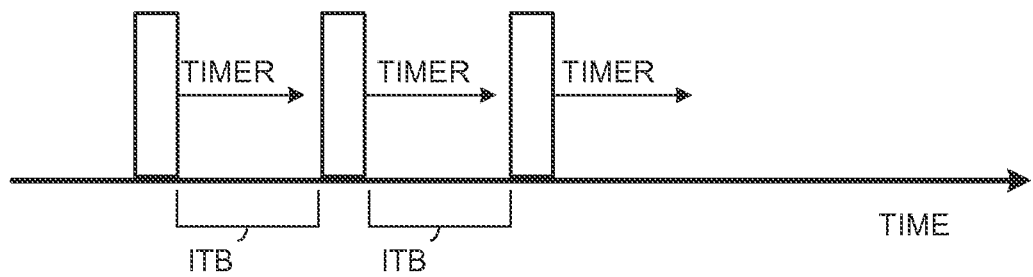

An IP flow from one user may for example be generated by an application that generates bursts with a periodic interval. Examples of such applications are numerous, e.g.: certain types of progressive download of video and audio, periodic polling of emails, etc. In a first case illustrated in FIG. 12A it is possible to make the decision of switching immediately if the expected time to the next burst is long enough, rather than wait the stipulated time by the static timers as in the prior art. For example, it is possible to make the decision of switching immediately if the expected time to the next burst is larger than the ITB threshold, which is shorter than the ITB shown in FIG. 12A. On the other hand, in a second case illustrated in FIG. 12B, the decision to stay is taken to avoid unnecessary switching. In the second case of FIG. 12B, the EITB is smaller than the ITB threshold, with the ITB threshold being longer than the ITB or EITB shown in FIG. 12B. Thus, static timers are not needed for switching decision purposes. Timers are shown in FIG. 12A and FIG. 12B only for sake of contrasting the behavior of this aspect of the technology disclosed herein with conventional timer-based switching.

The expected ITB (EITB) to next burst may be known or estimated based on measurements using different techniques. For example, the EITB may be known by measures such as knowing, e.g., from prior experience or historical information, the application generating the IP flow. In such case, the switch from first state to second state or stay on first state decision sub-unit 70 may comprise an association of the EITB with the particular application, such associating in an example implementation being a lookup table or chart or the like.

The criterion deciding a transition from state A to state B may be written as EITB>ITB_AB. A state transition procedure or algorithm executed by switch from first state to second state or stay on first state decision sub-unit 70 as PROC 2 is described below.

PROC 2:

---

IF UE in State A
THEN
    IF EITB > ITB_AB THEN go to State B
    ELSE Stay in State A
ENDIF

---

Thus, the switch from first state to second state or stay on first state decision sub-unit 70 allows the mobile telecommunications system to base switching decisions on Idle Time between Bursts (ITB) rather than on static timer settings. This allows the mobile telecommunication system to better adapt to certain IP flow characteristics. With this, unnecessary resource utilization as well as unnecessary switching is avoided, depending of the characteristics of the IP flow.

The switch from URA_PCH to Idle state is timer based, and there are no benefits in making the switch from URA_PCH to Idle state to be ITB based. In an example embodiment, however, a switch may be performed from CELL_DCH to Idle state when ITB or EITB is above a predefined threshold.

FIG. 3D illustrates more structural detail for a radio network controller node 26D which may be applicable to implementations of any of the foregoing embodiments of radio network controller nodes, e.g., for the embodiments of FIG. 3A-FIG. 3C, or other embodiments encompassed hereby. For example FIG. 3D illustrates that various elements of radio network controller node 26D may be provided on a machine platform 90. The terminology "platform" is a way of describing how the functional units of radio network controller node 26 can be implemented or realized by machine. The machine platform 90 can take any of several forms, such as (for example) a computer implementation platform or a hardware circuit platform. FIG. 3D particularly shows machine platform 90 as being a computer platform wherein logic and functionalities of radio network controller node 26D including but not limited to radio resource manager 40 are implemented by one or more computer processors or controllers as those terms are herein expansively defined. The radio resource manager 40 of FIG. 3D may represent radio resource managers any of the foregoing embodiments.

In such a computer implementation the radio network controller node 26D may comprise, in addition to a processor(s) 91, memory section 93, which memory section 93 in turn can comprise random access memory 94; read only memory 95; application memory 96, e g a non-transitory computer readable medium which stores, e.g., coded non-transitory instructions which can be executed by the processor to perform acts described herein; and any other memory such as cache memory, for example.

In the example of FIG. 3D the platform 90 has been illustrated as computer-implemented or computer-based platforms. Another example platform suitable for radio network controller node 26D is that of a hardware circuit, e.g., an application specific integrated circuit (ASIC) wherein circuit elements are structured and operated to perform the various acts described herein.

The technology disclosed in any of the embodiments described herein or encompassed hereby is general and applicable to any mobile telecommunications standard employing transitions between states like UE/RRC states.

The technology disclosed thus encompasses the following non-limiting example embodiments:

Example Embodiment E1

A node (26) for controlling transitions between radio resource control states for a wireless terminal (30) in a radio access network (24), the radio resource control states comprising a first state and a second state, the node (26) comprising:

a capacity manager (60) configured to monitor a network condition of the radio access network (24);

a radio resource manager (40) configured to make a decision whether to make a transition from the first state to the second state by determining whether (1) a cost of remaining in the first state is greater than (2) a cost of switching to the second state, and wherein the radio resource manager (40) is configured to take the network condition into consideration when making the decision.

Example Embodiment E2

The node of Example E1, wherein the cost of remaining in the first state comprises a cost in the first state (e.g., a per unit of time cost) multiplied by an expected time in the first state.

Example Embodiment E3

The node of Example E1 or E2, wherein the cost of switching to the second state comprises:

a cost of switching from the first state to the second state;

a cost of at least temporarily remaining in the second state; and, a cost of switching back from the second state to the first state.

Example Embodiment E4

The node of Example E3, wherein the cost of at least temporarily remaining in the second state comprises a cost in the second state multiplied by an expected time in the second state.

Example Embodiment E5

The node of Example E4 when dependent from E2, wherein for a certain state being either the first state or the second state, the cost of remaining in the certain state comprises a sum of event products for different events multiplied by the expected time in the certain state, each event product comprising a cost associated with a respective particular event of the different events multiplied by an intensity factor for the respective particular event.

Example Embodiment E6

The node of Example E5, wherein the respective particular event is a signaling event.

Example Embodiment E7

The node of Example E5 or E6, wherein the cost associated with the respective particular event and the intensity factor for the respective particular event are configured at the node.

Example Embodiment E8

The node of Example E5 or E6, wherein the cost associated with the respective particular event and the intensity factor for the respective particular event are derived during operation of the node based on node internal measurements.

Example Embodiment E9

The node of any preceding Example, wherein the network condition comprises a network congestion situation, and wherein the capacity manager (60) is configured to provide congestion information regarding the network congestion situation on one or more channels of the radio access network to the radio resource manager (40) and wherein the radio resource manager (40) is further configured to take the congestion information into consideration when making the decision.

Example Embodiment E10

The node of any preceding Example, wherein the network condition comprises load in the node, and wherein the capacity manager (60) is further configured to provide load information regarding the load in the node to the radio resource manager (40), and wherein the radio resource manager (40) is further configured to take the load information into consideration when making the decision.

Example Embodiment E11

The node of Example E10, wherein:

below a lower load threshold the radio resource manager (40) is configured to determine the cost of switching to the second state in terms of wireless terminal resource cost;

above a higher load threshold the radio resource manager (40) is configured to determine the cost of switching to the second state in terms of network resource cost; and between the lower load threshold and the higher load threshold the radio resource manager (40) is configured to determine the cost of switching to the second state in terms of a combination of the wireless terminal resource cost and the network resource cost.

Example Embodiment E12

The node of Example E10 when dependent from E9, wherein below a lower load threshold the radio resource manager (40) is configured to determine the cost of switching to the second state in terms of wireless terminal resource cost and the congestion information (62);

above a higher load threshold the radio resource manager (40) is configured to determine the cost of switching to the second state in terms of network resource cost and the congestion information (62); and between the lower load threshold and the higher load threshold the radio resource manager (40) is configured to determine the cost of switching to the second state in terms of the congestion information (62) and a combination of the wireless terminal resource cost and the network resource cost.

Example Embodiment E13

The node of Example E11 or E12, wherein between the lower load threshold and the higher load threshold the combination is a scaled combination of the wireless terminal resource cost and the network resource cost.

Example Embodiment E14

The node of Example E11 or E12, wherein the wireless terminal resource cost is expressed in terms of battery power utilization of the wireless terminal; and wherein the network resource cost is expressed in terms of node processing power utilization.

Example Embodiment E15

The node of Example E14, wherein power values for the battery power utilization of the wireless terminal when in the first state and when in the second state are configured at the node.

Example Embodiment E16

The node of Example E15, wherein the radio resource manager (40) comprises a battery power utilization table (56) for plural types of wireless terminals (30), and for each type of wireless terminal (30) the battery power utilization table (56) comprises battery power utilization values for plural radio resource states.

Example Embodiment E17

The node of Example E14, wherein the radio resource manager (40) is configured to associate a cost in terms of node processing capacity utilization, e.g., a percentage of node processing capacity utilization, with a given state.

Example Embodiment E18

The node of Example E14, wherein the radio resource manager (40) is configured to adaptively determine a cost in terms of node processing capacity utilization for the wireless terminal, e.g., a percentage of node processing capacity utilization for the wireless terminal, in a given state.

Example Embodiment E19

The node of any preceding Example, wherein the radio resource manager (40) is configured to know a cost for switching and to make the decision after cessation of transmission of each burst, including cessation of transmission of a burst from the wireless terminal and cessation of transmission of a burst from the radio access network to the wireless terminal, the decision regarding which one of the first state and the second state is appropriate for the wireless terminal until the next burst.

Example Embodiment E20

The node of Example E19, wherein the node (26) further comprises a traffic flow monitor (50) which is configured to measure time of packets arriving in a buffer and to determine cessation of the transmission of at least one of the bursts.

Example Embodiment E21

The node of Example E20, wherein the traffic flow monitor (50) is configured to determine a burst as comprising IP packets which arrive in the buffer within a maximum inter-arrival time.

Example Embodiment E22

The node of Example E20 or E21, wherein the traffic flow monitor (50) is configured to determine burst size of a burst as comprising a sum of sizes of the packets comprised in the burst.

Example Embodiment E23

The node of Example E20 to E22, wherein the traffic flow monitor (50) is configured to determine burst length of a burst as comprising run time of the packets comprised in the burst and time of gaps between the packets comprised in the burst.

Example Embodiment E24

The node of any preceding Example, wherein the radio resource control states include at least a CELL_DCH state; a CELL_FACH state, a URA_PCH state, and a CELL_PCH state, the first state being either the CELL_DCH state or the CELL_FACH state and the second state being either the URA_PCH state or the CELL_PCH state.

Example Embodiment E25

The node of any preceding Example, wherein the radio resource control states include at least a CELL_DCH state and a CELL_FACH state, and wherein the radio resource manager (40) is configured to make a decision regarding switching between the CELL_DCH state and the CELL_FACH state on the basis of at least one of the following parameters: burst length, burst size, and bit rate.

Example Embodiment E26

The node of Example E25, wherein the radio resource manager (40) is configured to make a decision to switch from CELL_DCH state to CELL_FACH state if a combination of the following parameters decrease below a respective threshold: the burst length, the burst size, or the bit rate.

Example Embodiment E27

The node of Example E25 or E26, wherein the radio resource manager (40) is configured to make a decision, to switch from the CELL_FACH state to the CELL_DCH state if any of the following parameters increase above a respective threshold: the burst length, the burst size, or the bit rate.

Example Embodiment E28

The node of Example E25, wherein the threshold for at least one of the parameters burst length, burst size, and bit rate is different when switching from the CELL_FACH state to the CELL_DCH state than when switching from the CELL_DCH state to the CELL_FACH state.

Example Embodiment E29

The node of any preceding Example, wherein the determining whether (1) a cost of remaining in the first state is greater than (2) a cost of switching to the second state is based on expected idle time between bursts.

Example Embodiment E30

The node of Example E29, wherein the traffic monitor (50) is configured to predict time between a last packet of a burst N and a first packet of a burst N+1 as the expected idle time between bursts.

Example Embodiment E31

The node of Example E29, wherein the traffic monitor (50) is configured to predict the expected idle time between bursts based on type of application associated with a packet flow which comprises the bursts.

Example Embodiment E32

The node of Example E29 or E30, wherein the expected idle time between bursts is pre-configured in the traffic monitor (50) based on the type of application associated with a packet flow which comprises the bursts.

Example Embodiment E33

The node of Example E29 or E30, wherein the traffic monitor (50) is configured to adaptively determine the expected idle time between bursts based on the type of application associated with a packet flow which comprises the bursts.

Example Embodiment E34

The node of Example E29, wherein the radio resource manager (40) is configured:
to make the decision whether to make the switch essentially immediately and upon termination of the burst if the expected idle time between bursts is greater than an ITB_threshold, wherein the ITB_threshold is set to a time interval at which the cost of remaining in the first state is equal to the cost of switching to the second state.

Example Embodiment E35

The node of any preceding Example, wherein the node is a radio network controller (RNC) node.

Example Embodiment E36

The node of any preceding Example, wherein the radio resource manager (40) comprises electronic circuitry.

Example Embodiment M1

A method in a node (26) for controlling transitions between radio resource control states for a wireless terminal (30) in a radio access network (24), the radio resource control states comprising a first state and a second state, the method comprising:
determining a network condition in the radio access network;
making a decision whether to make a transition from the first state to the second state by determining whether (1) a cost of remaining in the first state is greater than (2) a cost of switching to the second state, and taking the network condition into consideration when making the decision; and,
directing the wireless terminal either to remain in the first state or switch to the second state in accordance with the decision.

Example Embodiment M2

The method of Example M1, wherein the cost of remaining in the first state comprises a cost in the first state, e.g., a cost per unit of time, multiplied by an expected time in the first state.

Example Embodiment M3

The method of Example M1 or M2, wherein the cost of switching to the second state comprises:
a cost of switching from the first state to the second state;
a cost of at least temporarily remaining in the second state; and,
a cost of switching back from the second state to the first state.

Example Embodiment M4

The method of Example M3, wherein the cost of at least temporarily remaining in the second state comprises a cost in the second state multiplied by an expected time in the second state.

Example Embodiment M5

The method of Example M4 when dependent from M2, wherein for a certain state being either the first state or the second state, the cost of remaining in the certain state comprises a sum of event products for different events multiplied by the expected time in the certain state, each event product comprising a cost associated with a respective particular event of the different events multiplied by an intensity factor for the respective particular event.

Example Embodiment M6

The method of Example M5, wherein the respective particular event is a signaling event.

Example Embodiment M7

The method of Example M5 or M6, wherein the cost associated with the respective particular event and the intensity factor for the respective particular event are configured at the node.

Example Embodiment M8

The method of Example M5 or M6, wherein the cost associated with the respective particular event and the intensity factor for the respective particular event are derived during operation of the node based on node internal measurements.

Example Embodiment M9

The method of Example M1-M8, wherein the network condition comprises a network congestion situation, and further comprising providing congestion information regarding the network congestion situation on one or more channels of the radio access network and taking the congestion information into consideration when making the decision.

Example Embodiment M10

The method of Example M1-M9, wherein the network condition comprises load in the node, and further comprising providing load information regarding the load in the node and taking the load information into consideration when making the decision.

Example Embodiment M11

The method of Example M10, wherein:
below a lower load threshold, determining the cost of switching to the second state in terms of wireless terminal resource cost;
above a higher load threshold, determining the cost of switching to the second state in terms of network resource cost; and
between the lower load threshold and the higher load threshold, determining the cost of switching to the second state in terms of a combination of the wireless terminal resource cost and the network resource cost.

Example Embodiment M12

The method of Example M10 when dependent from M9, wherein:
below a lower load threshold, determining the cost of switching to the second state in terms of wireless terminal resource cost and the congestion information;
above a higher load threshold, determining the cost of switching to the second state in terms of network resource cost and the congestion information; and
between the lower load threshold and the higher load threshold, determining the cost of switching to the second state in terms of the congestion information and a combination of the wireless terminal resource cost and the network resource cost.

Example Embodiment M13

The method of Example M11 or M12, wherein between the lower load threshold and the higher load threshold the combination is a scaled combination of the wireless terminal resource cost and the network resource cost.

Example Embodiment M14

The method of Example M11 or M12, wherein the wireless terminal resource cost is expressed in terms of battery power utilization of the wireless terminal; and wherein the network resource cost is expressed in terms of node processing power utilization.

Example Embodiment M15

The method of Example M14, wherein power values for the battery power utilization of the wireless terminal when in the first state and when in the second state are configured at the node.

Example Embodiment M16

The method of Example M15, further comprising using a battery power utilization table for plural types of wireless terminals, for each type of wireless terminal the battery power utilization table comprises battery power utilization values for plural radio resource states.

Example Embodiment M17

The method of Example M14, further comprising associating a cost in terms of node processing capacity utilization with a given state.

Example Embodiment M18

The method of Example M14, further comprising adaptively determining a cost in terms of node processing capacity utilization for the wireless terminal in a given state.

Example Embodiment M19

The method of Example M1-Example M18, further comprising making the decision after cessation of transmission of each burst, including cessation of transmission of a burst from the wireless terminal and cessation of transmission of a burst from the radio access network to the wireless terminal, the decision regarding which one of the first state and the second state is appropriate for the wireless terminal until the next burst.

Example Embodiment M20

The method of Example M19, further comprising measuring time of packets arriving in a buffer and determining cessation of the transmission of any one of the bursts.

Example Embodiment M21

The method of Example M20, further comprising determining a burst as comprising IP packets which arrive in the buffer within a maximum inter-arrival time.

Example Embodiment M22

The method of Example M20 or M21, further comprising determining burst size of a burst as comprising a sum of sizes of the packets comprised in the burst.

Example Embodiment M23

The method of Example M20 to M22, further comprising determining burst length of a burst as comprising run time of the packets comprised in the burst and time of gaps between the packets comprised in the burst.

Example Embodiment M24

The method of Example M1-Example M23, wherein the radio resource control states include at least a CELL_DCH state; a CELL_FACH state, a URA_PCH state, and a CELL_PCH state, the first state being either the CELL_DCH state or the CELL_FACH state and the second state being either the URA_PCH state or the CELL_PCH state.

Example Embodiment M25

The method of any of Example M1-Example M24, wherein the radio resource control states include at least a CELL_DCH state and a CELL_FACH state, and further comprising making a decision regarding switching between the CELL_DCH state and the CELL_FACH state on the basis of at least one of the following parameters: burst length, burst size, and bit rate.

Example Embodiment M26

The method of Example M25, further comprising making a decision to switch from CELL_DCH state to CELL_FACH state if a combination of the following parameters decrease below a respective threshold: the burst length, the burst size, or the bit rate.

Example Embodiment M27

The method of Example M25 or M26, further comprising making a decision to switch from CELL_FACH state to CELL_DCH state if any of the following parameters increase above a respective threshold: the burst length, the burst size, or the bit rate.

Example Embodiment M28

The method of any of Example M1-Example M27, wherein the determining whether (1) a cost of remaining in the first state is greater than (2) a cost of switching to the second state is based on expected idle time between bursts.

Example Embodiment M29

The method of Example M28, further comprising predicting time between a last packet of a burst N and a first packet of a burst N+1 as the expected idle time between bursts.

Example Embodiment M30

The method of Example M27, further comprising predicting the expected idle time between bursts based on type of application associated with a packet flow which comprises the bursts.

Example Embodiment M31

The method of Example M28 or M29, further comprising pre-configuring the idle time between bursts based on the type of application associated with a packet flow which comprises the bursts.

Example Embodiment M32

The method of Example M28 or M29, further comprising adaptively determining the expected idle time between bursts based on the type of application associated with a packet flow which comprises the bursts.

Example Embodiment M33

The method of Example M28, further comprising:
making the decision whether to make the switch essentially immediately and upon termination of the burst if the expected idle time between bursts is greater than an ITB_threshold, wherein the ITB_threshold is set to a time interval at which the cost of remaining in the first state is equal to the cost of switching to the second state.

Although the description above contains many specificities, these should not be construed as limiting the scope of the technology disclosed herein but as merely providing illustrations of some of the presently preferred embodiments of the disclosed technology. Thus the scope of this technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A node for controlling transitions between radio resource control states for a wireless terminal in a radio access network, the radio resource control states comprising a first state and a second state, the node comprising:
a capacity manager configured to monitor a network condition of the radio access network;
a radio resource manager configured to make a decision whether to make a transition from the first state to the second state by determining whether (1) a cost of remaining in the first state is greater than (2) a cost of switching to the second state, and wherein the radio resource manager is configured to take the network condition into consideration when making the decision;
wherein the determining whether (1) a cost of remaining in the first state is greater than (2) a cost of switching to the second state is based on expected idle time between bursts.

2. The node of claim 1, wherein the network condition comprises a network congestion situation, and wherein the capacity manager is configured to provide congestion information regarding the network congestion situation on one or more channels of the radio access network to the radio resource manager and wherein the radio resource manager is further configured to take the congestion information into consideration when making the decision.

3. The node of claim 1, wherein the network condition comprises load in the node, and wherein the capacity manager is further configured to provide load information regarding the load in the node to the radio resource manager, and wherein the radio resource manager is further configured to take the load information into consideration when making the decision.

4. The node of claim 3, wherein:
below a lower load threshold the radio resource manager is configured to determine the cost of switching to the second state in terms of wireless terminal resource cost;
above a higher load threshold the radio resource manager is configured to determine the cost of switching to the second state in terms of network resource cost; and
between the lower load threshold and the higher load threshold the radio resource manager is configured to determine the cost of switching to the second state in terms of a combination of the wireless terminal resource cost and the network resource cost.

5. The node of claim 4, wherein between the lower load threshold and the higher load threshold the combination is a scaled combination of the wireless terminal resource cost and the network resource cost.

6. The node of claim 4, wherein the wireless terminal resource cost is expressed in terms of battery power utilization of the wireless terminal; and wherein the network resource cost is expressed in terms of node processing power utilization.

7. The node of claim 3, wherein the network condition comprises a network congestion situation, wherein the capacity manager is configured to provide congestion information regarding the network congestion situation on one or more channels of the radio access network to the radio resource manager and wherein the radio resource manager is further configured to take the congestion information into consideration when making the decision, wherein:
 below a lower load threshold the radio resource manager is configured to determine the cost of switching to the second state in terms of wireless terminal resource cost and the congestion information;
 above a higher load threshold the radio resource manager is configured to determine the cost of switching to the second state in terms of network resource cost and the congestion information; and
 between the lower load threshold and the higher load threshold the radio resource manager is configured to determine the cost of switching to the second state in terms of the congestion information and a combination of the wireless terminal resource cost and the network resource cost.

8. The node of claim 1, wherein the radio resource manager is configured to know a cost for switching and to make the decision after cessation of transmission of each burst, including cessation of transmission of a burst from the wireless terminal and cessation of transmission of a burst from the radio access network to the wireless terminal, the decision regarding which one of the first state and the second state is appropriate for the wireless terminal until the next burst.

9. The node of claim 1, wherein the radio resource control states include at least a CELL_DCH state; a CELL_FACH state, a URA_PCH state, and a CELL_PCH state, the first state being either the CELL_DCH state or the CELL_FACH state and the second state being either the URA_PCH state or the CELL_PCH state.

10. The node of claim 1, wherein the radio resource control states include at least a CELL_DCH state and a CELL_FACH state, and wherein the radio resource manager is configured to make a decision regarding switching between the CELL_DCH state and the CELL_FACH state on the basis of at least one of the following parameters: burst length, burst size, and bit rate.

11. The node of claim 10, wherein the radio resource manager is configured to make a decision to switch from CELL_DCH state to CELL_FACH state if a combination of the following parameters decreases below a respective threshold: the burst length, the burst size, or the bit rate.

12. The node of claim 11, wherein the radio resource manager is configured to make a decision, to switch from the CELL_FACH state to the CELL_DCH state, if any of the following parameters increase above a respective threshold: the burst length, the burst size, or the bit rate.

13. The node of claim 10, wherein the threshold for at least one of the parameters burst length, burst size, and bit rate is different when switching from the CELL_FACH state to the CELL_DCH state than when switching from the CELL_DCH state to the CELL_FACH state.

14. The node of claim 1, further comprising a traffic monitor configured to predict time between a last packet of a burst N and a first packet of burst N+1 as the expected idle time between bursts.

15. The node of claim 1, further comprising a traffic monitor configured to predict the expected idle time between bursts based on type of application associated with a packet flow which comprises the bursts.

16. The node of claim 1, wherein the radio resource manager is configured to make the decision whether to make the switch essentially immediately and upon termination of the burst if the expected idle time between bursts is greater than an ITB_threshold, wherein the ITB_threshold is set to a time interval at which the cost of remaining in the first state is equal to the cost of switching to the second state.

17. The node of claim 1, wherein the node is a radio network controller (RNC) node.

18. The node of claim 1, wherein the radio resource manager comprises electronic circuitry.

19. A method in a node for controlling transitions between radio resource control states for a wireless terminal in a radio access network, the radio resource control states comprising a first state and a second state, the method comprising:
 determining a network condition in the radio access network;
 making a decision whether to make a transition from the first state to the second state by determining whether (1) a cost of remaining in the first state is greater than (2) a cost of switching to the second state, and taking the network condition into consideration when making the decision; and,
 directing the wireless terminal either to remain in the first state or switch to the second state in accordance with the decision;
 wherein the determining whether (1) a cost of remaining in the first state is greater than (2) a cost of switching to the second state is based on expected idle time between bursts.

20. The method of claim 19, wherein the network condition comprises a network congestion situation, and further comprising providing congestion information regarding the network congestion situation on one or more channels of the radio access network and taking the congestion information into consideration when making the decision.

21. The method of claim 19, wherein the network condition comprises load in the node, and further comprising providing load information regarding the load in the node and taking the load information into consideration when making the decision.

22. The method of claim 21, wherein:
 below a lower load threshold, determining the cost of switching to the second state in terms of wireless terminal resource cost;
 above a higher load threshold, determining the cost of switching to the second state in terms of network resource cost; and
 between the lower load threshold and the higher load threshold, determining the cost of switching to the second state in terms of a combination of the wireless terminal resource cost and the network resource cost.

23. The method of claim 21, wherein the network condition comprises a network congestion situation, and further comprising providing congestion information regarding the network congestion situation on one or more channels of the radio access network and taking the congestion information into consideration when making the decision, wherein:

below a lower load threshold, determining the cost of switching to the second state in terms of wireless terminal resource cost and the congestion information;

above a higher load threshold, determining the cost of switching to the second state in terms of network resource cost and the congestion information; and between the lower load threshold and the higher load threshold, determining the cost of switching to the second state in terms of the congestion information and a combination of the wireless terminal resource cost and the network resource cost.

24. The method of claim 22, wherein between the lower load threshold and the higher load threshold the combination is a scaled combination of the wireless terminal resource cost and the network resource cost.

25. The method of claim 19, wherein the radio resource control states include at least a CELL_DCH state; a CELL_FACH state, a URA_PCH state, and a CELL_PCH state, the first state being either the CELL_DCH state or the CELL_FACH state and the second state being either the URA_PCH state or the CELL_PCH state.

26. The method of claim 19, wherein the radio resource control states include at least a CELL_DCH state and a CELL_FACH state, and further comprising making a decision regarding switching between the CELL_DCH state and the CELL_FACH state on the basis of at least one of the following parameters: burst length, burst size, and bit rate.

27. The method of claim 19, further comprising making the decision whether to make the switch essentially immediately and upon termination of the burst if the expected idle time between bursts is greater than an ITB_threshold, wherein the ITB_threshold is set to a time interval at which the cost of remaining in the first state is equal to the cost of switching to the second state.

28. A method in a node for controlling transitions between radio resource control states for a wireless terminal in a radio access network, the radio resource control states comprising a first state and a second state, the method comprising:

determining a network condition in the radio access network, wherein the network condition comprises load in the node;

making a decision whether to make a transition from the first state to the second state by determining whether (1) a cost of remaining in the first state is greater than (2) a cost of switching to the second state, and taking the network condition into consideration when making the decision;

directing the wireless terminal either to remain in the first state or switch to the second state in accordance with the decision;

providing load information regarding the load in the node and taking the load information into consideration when making the decision;

wherein:

below a lower load threshold, determining the cost of switching to the second state in terms of wireless terminal resource cost;

above a higher load threshold, determining the cost of switching to the second state in terms of network resource cost; and between the lower load threshold and the higher load threshold, determining the cost of switching to the second state in terms of a combination of the wireless terminal resource cost and the network resource cost.

29. The method of claim 28, wherein between the lower load threshold and the higher load threshold the combination is a scaled combination of the wireless terminal resource cost and the network resource cost.

30. A method in a node for controlling transitions between radio resource control states for a wireless terminal in a radio access network, the radio resource control states comprising a first state and a second state, the method comprising:

determining a network condition in the radio access network, wherein the network condition comprises a network congestion situation;

making a decision whether to make a transition from the first state to the second state by determining whether (1) a cost of remaining in the first state is greater than (2) a cost of switching to the second state, and taking the network condition into consideration when making the decision;

directing the wireless terminal either to remain in the first state or switch to the second state in accordance with the decision;

providing load information regarding the load in the node and taking the load information into consideration when making the decision;

providing congestion information regarding the network congestion situation on one or more channels of the radio access network and taking the congestion information into consideration when making the decision, wherein:

below a lower load threshold, determining the cost of switching to the second state in terms of wireless terminal resource cost and the congestion information;

above a higher load threshold, determining the cost of switching to the second state in terms of network resource cost and the congestion information; and between the lower load threshold and the higher load threshold, determining the cost of switching to the second state in terms of the congestion information and a combination of the wireless terminal resource cost and the network resource cost.

31. A node for controlling transitions between radio resource control states for a wireless terminal in a radio access network, the radio resource control states comprising a first state and a second state, the node comprising:

a capacity manager configured to monitor a network condition of the radio access network;

a radio resource manager configured to make a decision whether to make a transition from the first state to the second state by determining whether (1) a cost of remaining in the first state is greater than (2) a cost of switching to the second state, and wherein the radio resource manager is configured to take the network condition into consideration when making the decision;

wherein the network condition comprises load in the node, and wherein the capacity manager is further configured to provide load information regarding the load in the node to the radio resource manager, and wherein the radio resource manager is further configured to take the load information into consideration when making the decision; and wherein:

below a lower load threshold the radio resource manager is configured to determine the cost of switching to the second state in terms of wireless terminal resource cost;

above a higher load threshold the radio resource manager is configured to determine the cost of switching to the second state in terms of network resource cost; and between the lower load threshold and the higher load threshold the radio resource manager is configured to determine the cost of switching to the second state in terms of a combination of the wireless terminal resource cost and the network resource cost.

32. A node for controlling transitions between radio resource control states for a wireless terminal in a radio access network, the radio resource control states comprising a first state and a second state, the node comprising:

a capacity manager configured to monitor a network condition of the radio access network;

a radio resource manager configured to make a decision whether to make a transition from the first state to the second state by determining whether (1) a cost of remaining in the first state is greater than (2) a cost of switching to the second state, and wherein the radio resource manager is configured to take the network condition into consideration when making the decision;

wherein the network condition comprises load in the node, and wherein the capacity manager is further configured to provide load information regarding the load in the node to the radio resource manager, and wherein the radio resource manager is further configured to take the load information into consideration when making the decision;

wherein the network condition comprises a network congestion situation, wherein the capacity manager is configured to provide congestion information regarding the network congestion situation on one or more channels of the radio access network to the radio resource manager and wherein the radio resource manager is further configured to take the congestion information into consideration when making the decision, wherein:

below a lower load threshold the radio resource manager is configured to determine the cost of switching to the second state in terms of wireless terminal resource cost and the congestion information;

above a higher load threshold the radio resource manager is configured to determine the cost of switching to the second state in terms of network resource cost and the congestion information; and between the lower load threshold and the higher load threshold the radio resource manager is configured to determine the cost of switching to the second state in terms of the congestion information and a combination of the wireless terminal resource cost and the network resource cost.

33. A node for controlling transitions between radio resource control states for a wireless terminal in a radio access network, the radio resource control states comprising a first state and a second state, the node comprising:

a capacity manager configured to monitor a network condition of the radio access network;

a radio resource manager configured to make a decision whether to make a transition from the first state to the second state by determining whether (1) a cost of remaining in the first state is greater than (2) a cost of switching to the second state, and wherein the radio resource manager is configured to take the network condition into consideration when making the decision;

wherein the radio resource control states include at least a CELL_DCH state and a CELL_FACH state, and wherein the radio resource manager is configured to make a decision regarding switching between the CELL_DCH state and the CELL_FACH state on the basis of at least one of the following parameters: burst length, burst size, and bit rate; and wherein the radio resource manager is configured to make a decision to switch from CELL_DCH state to CELL_FACH state if a combination of the following parameters decreases below a respective threshold: the burst length, the burst size, or the bit rate.

34. The node of claim 33, wherein the radio resource manager is configured to make a decision, to switch from the CELL_FACH state to the CELL_DCH state, if any of the following parameters increase above a respective threshold: the burst length, the burst size, or the bit rate.

35. A node for controlling transitions between radio resource control states for a wireless terminal in a radio access network, the radio resource control states comprising a first state and a second state, the node comprising:

a capacity manager configured to monitor a network condition of the radio access network;

a radio resource manager configured to make a decision whether to make a transition from the first state to the second state by determining whether (1) a cost of remaining in the first state is greater than (2) a cost of switching to the second state, and wherein the radio resource manager is configured to take the network condition into consideration when making the decision;

wherein the radio resource control states include at least a CELL_DCH state and a CELL_FACH state, and wherein the radio resource manager is configured to make a decision regarding switching between the CELL_DCH state and the CELL_FACH state on the basis of at least one of the following parameters: burst length, burst size, and bit rate; and wherein the threshold for at least one of the parameters burst length, burst size, and bit rate is different when switching from the CELL_FACH state to the CELL_DCH state than when switching from the CELL_DCH state to the CELL_FACH state.

* * * * *

UNITED STATES PATENT AND TRADEMARK OFFICE
CERTIFICATE OF CORRECTION

PATENT NO. : 8,699,441 B2  
APPLICATION NO. : 13/341885  
DATED : April 15, 2014  
INVENTOR(S) : Stjernholm et al.

Page 1 of 1

It is certified that error appears in the above-identified patent and that said Letters Patent is hereby corrected as shown below:

In the Specification

Column 6, Line 64, delete "(TAT)," and insert -- (IAT), --, therefor.

Signed and Sealed this
Ninth Day of September, 2014

Michelle K. Lee
*Deputy Director of the United States Patent and Trademark Office*